(12) United States Patent
Aono et al.

(10) Patent No.: US 7,216,129 B2
(45) Date of Patent: May 8, 2007

(54) INFORMATION PROCESSING USING A HIERARCHY STRUCTURE OF RANDOMIZED SAMPLES

(75) Inventors: Masaki Aono, Yokohama (JP); Michael Edward Houle, Kawasaki (JP); Mei Kobayashi, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 10/370,224

(22) Filed: Feb. 19, 2003

(65) Prior Publication Data

US 2004/0162834 A1 Aug. 19, 2004

(30) Foreign Application Priority Data

Feb. 15, 2002 (JP) ............................. 2002-037842

(51) Int. Cl.
*G06F 17/30* (2006.01)
(52) U.S. Cl. .......................................... 707/102; 707/6
(58) Field of Classification Search .............. 707/1–10, 707/100–104.1, 200–205
See application file for complete search history.

(56) References Cited

U.S. PATENT DOCUMENTS

| | | | | |
|---|---|---|---|---|
| 5,325,298 A | * | 6/1994 | Gallant | 704/9 |
| 5,675,819 A | * | 10/1997 | Schuetze | 704/10 |
| 6,233,575 B1 | * | 5/2001 | Agrawal et al. | 707/6 |
| 6,523,026 B1 | * | 2/2003 | Gillis | 707/3 |
| 6,598,047 B1 | * | 7/2003 | Russell et al. | 707/5 |
| 6,704,729 B1 | * | 3/2004 | Klein et al. | 707/5 |
| 2004/0139067 A1 | * | 7/2004 | Houle | 707/3 |

OTHER PUBLICATIONS

Devasis Bassu and Clifford Behrens, Distributed LSI: Scalable Concept-based Information Retrieval with High Semantic Resolution, May 3, 2003, Telecordia Technologies.*

* cited by examiner

*Primary Examiner*—Mohammad Ali
*Assistant Examiner*—Navneet K Ahluwalia
(74) *Attorney, Agent, or Firm*—Ronald L. Drumheller; Richard M. Goldman; Marc D. McSwain

(57) ABSTRACT

A method is provided for retrieving information from massive databases (i.e., databases with millions of documents) in real time, that allows users to control the trade-off between accuracy in retrieved results and response times. The method may be applied to databases with contents, i.e., documents which have been modeled with a clearly defined metric that enables computation of distances between any two documents, so that pairs of documents which are "closer" with respect to the metric are more similar than pairs of documents which are "further apart". Our method can be applied to similarity ranking and/or can be combined together with other methods to increase the scalability of information retrieval, detection, ranking, and tracking.

16 Claims, 30 Drawing Sheets

Fig. 2 SASH Construction

SASH: $n$ data elements are randomly assigned to one of $h$ levels.

Child list C(u) of node u: the closest nodes having as a parent are selected as the children of u.

Fig. 7

- Euclidean ($L_2$):

$$\mathrm{dist}(a,b) = \sqrt{\sum_{i=1}^{d}(b_i - a_i)^2}$$

- Squared Euclidean ($L_2^2$):

$$\mathrm{dist}(a,b) = \sum_{i=1}^{d}(b_i - a_i)^2$$

- Manhattan ($L_1$):

$$\mathrm{dist}(a,b) = \sum_{i=1}^{d}|b_i - a_i|$$

- Vector Angle:

$$\mathrm{dist}(a,b) = \arccos \frac{\sum_{i=1}^{d} a_i b_i}{\sqrt{(\sum_{i=1}^{d} a_i^2)(\sum_{i=1}^{d} b_i^2)}}$$

SASH node: pointers and distances to nodes at adjacent levels. The pointer to the guarantor is shaded.

INFORMATION PROCESSING USING A HIERARCHY STRUCTURE OF RANDOMIZED SAMPLES

FIELD OF THE INVENTION

The present invention relates to information processing in a large database, and more particularly relates to a method, a computer system, a program product and a program therefore useful for information processing such as information retrieval, detection, ranking and tracking of information stored in a large database storing such items as documents, by a hierarchy structure of randomized samples.

BACKGROUND OF THE ART

Recently, information processing systems are increasingly expected to handle large amounts of data such as, for example, news data, client information, stock data, etc. Users of such databases find it increasingly difficult to search desired information quickly and effectively with sufficient accuracy. Therefore, timely, accurate, and inexpensive detection of new topics and/or events from large databases may provide very valuable information for many types of businesses including, for example, stock control, futures and options trading, news agencies which could afford to quickly dispatch a reporter without being able to afford a number of reporters posted worldwide, and businesses based on the internet or other fast paced environments, which need to know new and important information about competitors in order to succeed.

Conventionally, detection and tracking of new events in enormous databases is expensive, elaborate, and time consuming work, because searchers of the database usually need to hire extra persons for monitoring thereof.

Most of the recent detection and tracking methods used for search engines use a vector model for data in the database in order to cluster the data. In vector space models, each document in the database under consideration is modeled by a vector, each coordinate of which represents an attribute of the document. Ideally, only those attributes that can help distinguish documents from one another during information retrieval are incorporated in the attribute space. In a Boolean model, each coordinate of the vector is zero (when the corresponding attribute is absent) or unity (when the corresponding attribute is present). Many refinements of the Boolean model exist. The most commonly used are term weighting models which take into account the frequency of appearance of an attribute (e.g., keyword) or location of appearance (e.g., keyword in the title, section header or abstract). In the simplest retrieval and ranking systems, each query is also modeled by a vector in the same manner as the documents.

Prior Art

1. Similarity Search

Similarity search (also known as proximity search) is one in which items of a database are sought according to how well they match a given query vector. Similarity (or rather, dissimilarity) is typically modeled using some real- or integer-valued distance "metric" dist: that is, (1) dist(p, q)$\geq$0 for all p, q (non-negativity);
(2) dist(p, q)=dist(q, p) for all p, q (symmetry);
(3) dist(p, q)=0 if and only if p=q;
(4) dist(p, q)+dist(q, r)$\geq$dist(p, r) for all p, q, r (triangle inequality).

Any set of objects for which such a distance function exists is called a metric space. A data structure that allows a reduction in the number of distance evaluations at query time is known as an index.

Similarity queries on metric spaces are of two general types: (A) k-nearest-neighbor query: given a query element q and a positive integer k, report the k closest database elements to q. (B) range query: given a query element q and a distance r, report every database item p such that dist(p, q)$\leq$r.

For large databases, it is too expensive to perform similarity queries by means of explicitly computing the distances from the query vectors to every database element. Precomputing and storing all distances among database elements is also too expensive, as this would require time and space proportional to the square of the number of database elements (that is, quadratic time). A more practical goal is to construct a search structure that can handle queries in sublinear time, preferably using subquadratic storage and preprocessing time.

2. Similarity Search Structures

A great variety of structures have been proposed over the past thirty years for handling similarity queries. The majority of these are spatial indices, which require that the object set be modeled as a vector of d real-valued keywords. This family includes such classic search structures as quadtrees, k-d-trees, and B-trees, as well as newer structures as R*-trees, SR-trees and X-trees. Over the past decade, indices for general metric spaces have also been proposed, such as vantage-point trees (VPT), geometric near-neighbor access trees (GNAT), spatial approximation trees (SAT), and M-trees. These "metric" search structures make no assumptions on the nature of the database elements other than the existence of a distance metric, and are therefore more widely-applicable than spatial search structures.

Counter-intuitively, Ciaccia et al. have shown (in Paolo Ciaccia and Marco Patella, PAC nearest neighbor queries: approximate and controlled search in high-dimensional and metric spaces, Proc. 16$^{th}$ International Conference on Data Engineering (ICDE 2000), San Diego, USA, 2000, pp. 244–255) evidence that a metric search structure, an M-tree variant, is competitive with a popular spatial index, the R*-tree, on vector data. Recent surveys of search structures for multi-dimensional vector spaces and metric spaces are reviewed in elsewhere (Edgar Chavez, Gonzalo Navarro, Ricardo Baeza-Yates and Jose L. Marroquin, Searching in metric spaces, ACM Computing Surveys vol. 33, No. 3, pp. 273–321, 2001).

The practicality of similarity search, whether it be on metric data or vector data, is limited by an effect commonly referred to as "the curse of dimensionality". Traditional indexing techniques for vector spaces (such as k-d-trees) have an exponential dependency on the representational dimension of the space. Metric indexing can be a more practical alternative when the so-called "intrinsic dimension" of the data is significantly less than that of the representational dimension of the space.

For vector spaces, the intrinsic dimension can be thought of as the minimum dimension into which the data points can be embedded so as to preserve the distances among them (a 2-dimensional plane in 100-dimensional space would have an intrinsic dimension of 2 and a representational dimension of 100). For metric spaces, the intuitive notion of intrinsic dimension has been quantified in various ways; see for example Chavez et al., op. cito, and Pestov (Vladimir Pestov, On the geometry of similarity search: dimensionality curse and concentration of measure, Information Processing Letters, 73, 2000, pp. 47–51) for discussions.

The latter paper demonstrates that "naturally occurring" spaces and distributions possess a "concentration property" that ultimately leads to an exponential lower bound on search times in terms of the dimension. In other words, the curse of dimensionality is due to the distribution of distances from the query element to the database elements; as the (representational or intrinsic) dimension increases, the variance of the distance decreases, and searching becomes more difficult. As a consequence, no known indexing techniques can directly handle general (exact) proximity queries in spaces of intrinsic dimension more than roughly 20. Beyond this limit, the number of distance computations required means that the methods are no longer competitive with a sequential search of the entire database.

3. Related Metric Indexing Structures

Two existing metric indices most relevant to our proposed system: the M-tree due to Ciaccia et al., op. cito, and the SAT due to Navarro (Gonzalo Navarro, Searching in metric spaces by spatial approximation, Proc. String Processing and Information Retrieval (SPIRE '99), IEEE CS Press, 1999, pp. 141–148).

<M-trees>

Several variants of M-trees exist; here the variant reported as being most effective will be explained. Each node stores up to m "pivot" elements $p_1, p_2, \ldots, p_m$ chosen from the set of available database elements. Each pivot is associated with a pointer to a subtree. The remaining available elements are assigned to the subtree associated with the closest pivot; that is, element s is assigned to the subtree of pivot $p_i$ only if $dist(s, p_i) \leq dist(s, p_j)$ for all $i \neq j$ (ties are broken arbitrarily). Elements assigned to common subtrees are then recursively organized into M-trees. Stored with each pivot p is its covering radius, defined as $dist(p, \phi(p))$, where $\phi(p)$ is the farthest element from p in its subtree.

When searching the tree, the covering radius is used to eliminate subtrees that cannot possibly contain elements satisfying the query. For a range query with query item q and range r, the triangle inequality ensures that if $$dist(q, p) > r + dist(p, \phi(p)),$$

no element of the subtree of p can appear in the solution. Otherwise, the subtree of p must be searched.

An M-tree is constructed via dynamic insertion, in a manner similar to that of a B-tree. Starting from the top level "root" node, the element is inserted into the subtree that causes the smallest increase in its covering radius. If there is a tie, the element is inserted into the subtree of the closer pivot. This process continues until the bottom level of the tree is reached. If the number of existing pivots at this "leaf" node is less than m, the new element is added to this node as a pivot. Otherwise, an overflow occurs; the node is then split into two, and an element is promoted upward (which can in turn trigger another split). There are several variations by which nodes are split and elements are selected for promotion.

<Spatial Approximation Trees (SATs)>

As the name suggests, a SAT attempts to capture the proximity relationships among database elements, by choosing its edges so as to minimize the distances along them. At the root node, an element p is selected. The set N of children connected to p consists of those database elements that have p as a nearest neighbor. Any remaining element u not in N ∪ {p} is assigned to the subtree associated with its closest element in N. For each subtree, the elements assigned to it are recursively organized into a SAT.

Searching for an individual item can be performed by iteratively determining the child node whose element is closest to the query item, and following the edge to it. The range search for element q is an adaptation of the search for an individual item, which can be viewed as a simultaneous search for all items in the closed ball $\{q' | dist(q, q') \leq r\}$ with radius r centered at q.

4. Approximate Similarity Searching

In an attempt to circumvent the curse of dimensionality, conventional techniques have considered sacrificing some of the accuracy of similarity queries in the hope of obtaining a speed-up in computation. Together with the query, one typically specifies a precision parameter $\epsilon > 0$ that determines the degree to which the query result can vary from the exact result. Generally, if $r_k$ is the (unknown) distance from a query element q to its kth-nearest neighbor, a $(1+\epsilon)$-approximate k-nearest-neighbor query would return a set of elements U such that $|U| = k,$ $dist(q, u) \leq (1+\epsilon) r_k$ for all $u \in U$.

5. Vector Spaces

There exist a number of approximation algorithms of this type for vector spaces. A characteristic shared by these algorithms is that their query execution times still scale very poorly as k and the dimension d increase, and as $\epsilon$ decreases. A representative example is the algorithm for Minkowski metrics due to Arya et al. (Sunil Arya, David M. Mount, Nathan S. Netanyahu, Ruth Silverman and Angela Y. Wu, An optimal algorithm for approximate nearest neighbor searching in fixed dimensions, Journal of the ACM, 45, 6, 1998, pp. 891–923.). Here, a $(1+\epsilon)$-approximate k-nearest-neighbor query would require time proportional to $$O([(1+6d\epsilon^{-1})^d + 2k] d \log n).$$

They reported that the exponential factor was smaller in practice than indicated by this bound, but admit that the practicality of their method was limited to roughly 20 dimensions. They noted that the results of $(1+\epsilon)$-approximate nearest neighbor queries are often much more accurate, in that $dist(q, u)[(1+\epsilon')r_k$ for some $\epsilon' << \epsilon$. Although this would seem to be an advantage, in practice, the above method makes it very difficult to determine an appropriate value for $\epsilon$.

Recently, Ferhatosmanoglu et al. (Hakan Ferhatosmanoglu, Ertem Tuncel, Divyakant Agrawal and Amr El Abbadi, Approximate nearest neighbor searching in multimedia databases, Proc. 17$^{th}$ International Conference on Data Engineering (ICDE 2001), Heidelberg, Germany, 2001, pp. 503–514) proposed an approximation algorithm for vector spaces that has achieved excellent results for low dimensions. In a preprocessing step, the data is partitioned into a large number of small clusters using a variant of the well-known "k-means" heuristic (the "k" in "k-means" refers to the number of clusters sought). Each cluster is associated with a representative vector $r_i$, and a data element u is considered to belong to the i-th cluster if $dist(u, r_i) \leq dist(u, r_j)$ for all $j \neq i$ (if u satisfies this condition for more than one cluster, it is arbitrarily assigned to one of them). An initial choice of representatives is iteratively refined in a two-step loop, that terminates when no further improvements are made:

Step 1: Form clusters by assigning the data elements to their closest representatives.

Step 2: Average the vector data for each cluster to obtain new cluster representatives.

The sizes of the clusters are restricted to lie between minimum and maximum values, with the minimum value being of the same order of magnitude as the typical query size. This is accomplished during the iteration by splitting a cluster representative into two when its cluster becomes too large, and deleting the representative cluster when its cluster becomes too small.

To perform k-near-neighbor queries using the clustering, Ferhatosmanoglu et al. use the following method:

Step 1: Rank the clusters in increasing order of distance from query vector to representative vector.

Step 2: Based on the first few coordinates of the vector representation, sort the cluster element according to their distance from the query point. Note that that the closest k points as a tentative solution to the k-near-neighbor query.

Step 3: Refine the tentative solution by including either the next cluster in the ranked list or the next few coordinates of the vector representation, and repeating Steps 1 and 2 for the expanded set.

In their implementation, Ferhatosmanoglu et al. showed on several data sets that accuracy on the order of 90% can be achieved with substantial speedup over sequential search (brute force): for small sets (up to 12,000 points) speedups of up to 30 times were observed at this level of accuracy, and for a large set (100,000 points) the speedup was roughly 17. Unfortunately, the authors did not state the number of dimensions to which the data had been reduced. Despite these successes, their method suffers from several marked drawbacks as follows:

(1) The quality of the result depends heavily on the success of clustering. Although k-means is popular due to its efficiency, it is notorious for producing poor-quality clusterings. The heuristic is particularly sensitive to the initial choice of representative vectors available to it. Also, some data sets may consist of natural clusters that are many orders of magnitude larger than the query size; in general, it makes no sense to try to cluster data within large regions of uniform or nearly-uniform density. For more details regarding the k-means heuristic and its performance, see (Leonard Kaufman and Peter J. Rousseeuw, Finding Groups in Data: an Introduction to Cluster Analysis, John Wiley & Sons, New York, USA, 1990).

(2) The imposition of upper and lower bounds on the cluster sizes can result in a situation where the k-means heuristic does not converge to a solution. The elimination of a cluster representative can result in the cluster elements being assigned to a larger cluster. If this causes the larger cluster to exceed the maximum size limit, the resulting split could restore the small cluster previously eliminated. The ensuing cycle would prevent the method from terminating.

Ferhatosmanoglu et al. tested their method on data sets of relatively low dimension, using general dimensional reduction techniques (for example, 64 dimensions down to 8). As the number of distance computations performed rises linearly with the dimension, their results cannot be expected to scale as well to those situations in which the reduced dimension is high, such as text-based information retrieval, where dimensions in the thousands are reducible to dimensions in the hundreds. There is no clear way to determine when the near neighbor search should be terminated. This drawback severely limits the practicability of the method.

6. Metric Spaces

Approximate k-nearest neighbor queries have only recently been considered for metric search structures. Zezula et al. (Pavel Zezula, Pasquale Savino, Giuseppe Amato and Fausto Rabitti, Approximate similarity retrieval with M-trees, The VLDB Journal, 7, 1998, pp. 275–293) and Ciaccia et al. (2000), op. cito, have proposed methods based on the M-tree that can be adapted for other metric tree indices as well. All four are variations on an exact technique for general metric tree indices. In brief, the exact method maintains a priority queue PQ of database elements, ranked according to their distances from the query element q. Initially, PQ consists of the elements stored at the root of the tree.

At each iteration, the highest-ranked element p is deleted from PQ. If p is closer to q than the kth-closest database element found thus far, then p replaces this element. Next, the children of p are considered. The triangle inequality is used to eliminate those children for which no descendant can possibly be closer to the query element than the kth-closest database element found thus far. The remaining children are inserted into PQ. The exact algorithm terminates when the set of pending elements PQ becomes empty. When it terminates, the k closest elements encountered during the execution form the (exact) solution to the query.

Three modifications of this exact algorithm were proposed by Zezula et al. op. cito,; a fourth was proposed by Ciaccia et al. op. cito. We only briefly describe them here.

(1) If the distance from q to its current k-nearest neighbor is reduced by a factor of $1/(1+\epsilon)$ for the purpose of the acceptance tests, the result of the query is a $(1+\epsilon)$-approximate solution. Any tightening of the acceptance conditions can only reduce the number of distance computations performed.

(2) If the distribution of distances from q to the database elements is known, this information can be used to determine the rank of the current k-nearest neighbor. If the rank is better than a desired threshold, execution can be terminated early. The result would be an approximation, where the quality is determined by the rank. In practice, the distribution of distances from q is not known; for such situations, Zezula et al. proposed that an estimate be derived from the global distribution of the database elements.

(3) In their experimentation on M-trees, Zezula et al. observed that as the execution progresses, the distance to the tentative k-nearest neighbor quickly drops to close to its final value, and thereafter improves only slowly. They proposed that an approximate solution be generated by stopping the execution at that point when the distance curve flattens out (determined by means of a derivative evaluated using standard numerical analysis techniques). Early termination of the execution would again result in a speedup at the cost of accuracy.

(4) The first two methods of Zezula et al. can be combined. Ciaccia et al. used a careful choice of threshold for the second method to develop a probably approximately correct (PAC) algorithm for the single nearest neighbor problem. The algorithm provides a $(1+\epsilon)$-approximate solution for the single nearest neighbor problem with confidence level $(1-\delta)$; that is, the probability of the result not being a $(1+\epsilon)$-approximate solution is at most $\delta$. As with the error parameter $\epsilon$, the confidence parameter $\delta$ can be chosen by the user. However, the method is still dependent on knowledge of the distribution of distances from q (or an estimate thereof).

Zezula et al. op. cito., implemented all three of their methods on data sets of 10,000 elements in 45-dimensions, using the Euclidean metric. Based on the results from their experiments, they claim that the first method is not competitive with the other two in terms of efficiency. For queries with k=10, for the third method they claim speedups of a factor of 20 with observed error $\epsilon$=0.15 and a "precision" of 30% (roughly speaking, on the order of 30% of the elements reported would have been in the exact k-nearest neighbor list). For the second method, they claim (for example) speedups of a factor of 20 with observed error $\epsilon$ between 0.10 and 0.20 and precision between 0.10 and 0.45; for larger choices of the threshold, they claim speedups of a factor of 40, but with high observed error (>0.80 in some cases) and poor precision (<0.02 in some cases). They claim that for fixed precision and error, the speedup ratio of their methods do not change appreciably as k increases, and increases as n increases (indicating a sublinear query time).

Ciaccia et al. op. cito. implemented their method on data sets of 100,000 elements drawn uniformly from the unit hypercube in 40-dimensional space, using the Euclidean metric. They claimed speedups in the execution time of one to two orders of magnitude, depending on the choices of the error $\epsilon$ and confidence d: the speedups increase as the error increases and confidence decreases.

Between them, Zezula et al. and Ciaccia et al. reported good performance on real and synthetic databases of tens or hundreds of thousands of elements with intrinsic dimension in the range 40 to 60. Nevertheless, their methods have several significant drawbacks as noted below:

(1) As with approximation algorithms such as that of Arya et al., the potential of large discrepancies between the requested accuracy $\epsilon$ and the observed accuracy $\epsilon'$ make it difficult to determine an appropriate value of $\epsilon$ in practice. Ciaccia et al. suggest choosing $\epsilon$ based on prior experimental determination of $\epsilon'$ for the data set under consideration.

(2) The second method makes use of a parameter that strongly depends on knowledge of the distribution of the distances between the query element and the database elements (we call this distribution the query-to-element distance distribution, QEDD.) In practice, as queries are generally not known in advance, their QEDDs cannot be determined efficiently. The authors suggest that the QEDD can be estimated using the overall element-to-element distance distribution (EEDD) of the database, which itself can be estimated by means of averaging (Zezula et al.) or random sampling (Ciaccia et al.). However, the assumption that the EEDD is a good estimator for a QEDD presupposes that the QEDD of all queries are similar, which in general is not the case. If the data is highly structured, with wide variation in density, there may be no single choice of parameters that could avoid a severe degradation in performance if the EEDD were to be used. If it were to be extended to find approximate k-nearest neighbors, the fourth (hybrid) method would also have the same drawback.

(3) The third method, with its derivative-based stopping criterion, suffers from drastic swings in the computation accuracy and computation speed. It would thus be difficult if not impossible to tune the method to give consistently good performance. The authors' own experimental work seems to confirm this tendency; the details are presented in Zezula et al. (1998).

(4) None of the methods of Zezula et al. seem to be well-suited to finding approximate solutions with both high accuracy (for example, with precision above 70% or 80%) and reasonable speedup. The hybrid method of Ciaccia is highly unlikely to do much better than these methods even if one managed to extend it to the k-nearest neighbor problem.

(5) As its authors themselves admit, the first method is not competitive in practice even with the second and third methods. As described above, several attempts for improving the performance of similarity search have been made so far. However, several essential problems still remain, as summarized below:

Problem 1: Similarity Ranking in Real Time

Fast and accurate information retrieval from massive databases is a very difficult problem. Techniques which lead to fairly good results for moderate to large databases are not applicable for massive databases. The scalability of the information retrieval problem associated with massive databases is well-documented in the literature, where it is referred to as the "curse of dimensionality".

Problem 2: Enhancing the Scalability of LSI and COV

Two methods for retrieving information from moderate to large databases, LSI (latent semantic information retrieval) and COV (covariance matrix method), both perform similarity-based ranking by first computing the distances between the query vector and every document vector in the database. For this reason, neither can retrieve information from massive databases in a reasonable amount of time even after significant reduction in dimension (e.g., to 20 dimensions) of the vector space model of databases.

Problem 3: Speed and Accuracy Trade-offs

Some users may not be willing to wait more than a few seconds for ranked results from an information retrieval system. These users may be happier to receive less accurate results in a second or two rather than more accurate results after a longer wait. They may wish to specify the time to be spent on a given query, and obtain the most accurate result possible within the specified time. Current information retrieval systems do not allow users to control the trade-off parameter in a user-friendly manner.

Therefore, there is still need for a novel method and system for further improving the performance of information retrieval, detection, and ranking.

SUMMARY OF THE INVENTION

The present invention is partly due to the recognition that when a controlled hierarchy structure is introduced into document data, the efficiency of similarity ranking, retrieval, detection and/or tracking thereof may be significantly increased while reducing computer resources and computation time.

Therefore, an object of the present invention is to provide a method for information processing using a pre-computed, hierarchical document search structure. In the present invention, each document is given a location within the structure, and each connection between two documents indicates that they are closely related. Each level of the hierarchy consists of a random sample of the documents.

Another object of the present invention is to provide a method for information processing which can significantly enhance the scalability of the LSI (Latent Semantic Indexing) and the COV (Covariance matrix) dimensional reduction methods. For both of the LSI and COV methods, our method can be used after the projection of document and query vectors into the reduced dimensional subspace. If our method is used instead of the usual similarity ranking procedure in LSI and COV, the speed of ranking the similarity of documents with respect to the query is significantly reduced.

A further object of the present invention is to provide a method for information processing which allows each user to decide the ideal trade-off point between accuracy and response time based on the user's individual needs.

According to the present invention, a method for information processing, the information being stored in a database and including attributes, the information at least including a vector of numeral elements and information identifiers to form a matrix, the vector being a node in a hierarchy structure of the information, is provided. The method comprises the steps of:

reducing a dimension of the matrix to a predetermined order to provide a dimension reduced matrix;

randomly assigning vectors of said dimension reduction matrix to a set of nodes;

constructing a hierarchy structure of the nodes, the hierarchy structure being layered with hierarchy levels starting from a top node;

determining parent nodes and child nodes thereof between adjacent hierarchy levels, the parent nodes being included in an upper level and the child nodes being included in a lower level;

generating relations between the parent nodes and the child nodes, providing a query to rank the nodes with respect to the query;

selecting the nodes to generate a cluster including the ranked nodes with respect to the query.

In the present invention, the reduction step may comprise the step of reducing dimension of the matrix using latent semantic indexing or the covariance matrix method. In the present invention, the generation step may comprise the step of selecting the nodes with respect to distance between nodes. In the present invention, the generation step further comprises the steps of:

providing pointers from each child node to parent nodes in relation to the distance;

registering pointers from the parent nodes back to the child nodes, by starting from a child having closest distance until either a predetermined number of pointers indicating child nodes have been registered, or pointers to all available child nodes have been registered. In the present invention, the generating step further comprises the second step of generating another pair of pointers between a parent node and at least one child node having failed to generate the relation, the parent node being permitted to generate the pair of pointers and not having reached a predetermined number of pointers indicating child nodes.

In the present invention, the information processing may be selected from the group consisting of information retrieval, information detecting, information ranking, information tracking and any combination thereof.

In a second aspect of the present invention, an information processing system comprising a computer, an output/input interface and a database, the information being stored in a database and including attributes, the information at least including a vector of numeral elements and information identifiers to form a matrix, the vector being a node in a hierarchy structure of the information is provided. The information processing system comprises:

means for reducing a dimension of the matrix to a predetermined order to provide a dimension reduced matrix;

means for randomly assigning vectors of said dimension reduction matrix to a set of nodes;

means for constructing a hierarchy structure of the nodes, the hierarchy structure being layered with hierarchy levels starting from a top node;

means for determining parent nodes and child nodes thereof between adjacent hierarchy levels, the parent nodes being included in an upper level and the child nodes being included in a lower level;

means for generating relations between the parent nodes and the child nodes, means for providing a query to rank the nodes with respect to the query;

means for selecting the nodes to generate a cluster including the ranked nodes with respect to the query.

In a third aspect of the present invention, a computer readable medium storing a computer readable program for executing a method for information processing in a computer, the information being stored in a database and including attributes, the information at least including a vector of numeral elements and information identifiers to form a matrix, the vector being a node in a hierarchy structure of the information, is provided. The method comprises the steps of:

reducing a dimension of the matrix to a predetermined order to provide a dimension reduced matrix;

means for randomly assigning vectors of said dimension reduction matrix to a set of nodes;

constructing a hierarchy structure of the nodes, the hierarchy structure being layered with hierarchy levels starting from a top node;

determining parent nodes and child nodes thereof between adjacent hierarchy levels, the parent nodes being included in an upper level and the child nodes being included in a lower level;

generating relations between the parent nodes and the child nodes, providing a query to rank the nodes with respect to the query;

selecting the nodes to generate a cluster including the ranked nodes with respect to the query.

In a fourth aspect of the present invention, a computer executable program for information processing being possible to be implemented into a computer, the information being stored in a database and including attributes, the information at least including a vector of numeral elements and information identifiers to form a matrix, the vector being a node in a hierarchy structure of the information, is provided. The computer program executes the steps of:

reducing a dimension of the matrix to a predetermined order to provide a dimension reduced matrix;

means for randomly assigning vectors of said dimension reduction matrix to a set of nodes;

constructing a hierarchy structure of the nodes, the hierarchy structure being layered with hierarchy levels starting from a top node;

determining parent nodes and child nodes thereof between adjacent hierarchy levels, the parent nodes being included in an upper level and the child nodes being included in a lower level;

generating relations between the parent nodes and the child nodes, providing a query to rank the nodes with respect to the query;

selecting the nodes to generate a cluster including the ranked nodes with respect to the query.

DETAILED DESCRIPTION OF INVENTION

<General Procedure>

FIG. 1 shows a general method according to the present invention. The method of the present invention begins from the step S10 and proceeds to the step S12 where documents in a database are transformed into vectors using the vector space model to create document-keyword matrix. In the present invention, information may include documents, texts, graphic data etc., and attributes included herein may include keywords, time information such as date or year, and characters. However, in the present description, the information is assumed to be documents, and attributes included therein are assumed to be keywords, for clearness of explanation of the invention. In the present invention, the process may include a simple binary model as described by Salton, and may include rather sophisticated methods using weight factors which are determined by the frequency of appearance of attributes and/or by user input.

The method of the present invention proceeds to the step S14 where the derived document-keyword matrix is subjected to the dimension reduction for information retrieval etc. using the LSI method or the COV method to reduce the dimensionality of the documents to a desired value. For our example, one might choose a target dimension of roughly 100 to 200. Both methods are summarized later.

The method of the present invention next proceeds to the step S16, where the document-keyword vectors are introduced with a hierarchy structure using distance between the document-keyword vectors named as, in the present invention, "Spatial Approximation Sample Hierarchy; SASH" (hereunder referred to only as SASH).

In the SASH used in the present invention, a distance relation with respect to two document-keyword vectors is introduced to the randomized document-keyword matrices. In the initial document-keyword matrix, no edges are present even in the SASH, and hence the document-keyword vectors in the database are assigned to the nodes uniformly at random.

In this manner, the predesignated top node of the hierarchy receives a randomly chosen document-keyword vector. Then the relationships between the document-keyword vector may be introduced into the hierarchy structure using distances between the nodes. Further detail is explained below. The term "node" refers herein to each of the document-keyword vectors included in the hierarchy structure.

The method of the present invention proceeds to the step S18 to obtain a keyword query such as user input etc. The obtained keyword query is also converted to a query vector using binary model and/or weighted methods.

Next, the method of the present invention proceeds to the step S20 to execute the similarity-based information retrieval using the document-keyword matrix which is introduced with the hierarchy structure and the query vector using a conventional method.

The elemental steps described in FIG. 1 are further detailed herein; however, the details of the implementation are only illustrated as an exemplary embodiment and any other equivalent process may be adopted in the present invention.

A. Dimension Reduction (Step S14)

As described earlier, the present invention uses the dimension reduction of the document-keyword matrix. Representative examples useful in the present invention are the LSI method and the COV method.

<Latent Semantic Indexing>

Latent semantic indexing (LSI) is a vector space model-based algorithm for reducing the dimension of the document ranking problem; see Deerwester et al. (1989) and (1990) (Scott Deerwester, Susan T. Dumais, George W. Furnas, Richard Harshman, Thomas K. Landauer, Karen E. Lochbaum, Lynn A. Streeter, Computer information retrieval using latent semantic analysis, U.S. Pat. No. 4,839,853, filed Sep. 15, 1988, issued Jun. 13, 1989; Scott Deerwester, Susan T. Dumais, George W. Furnas, Thomas K. Landauer, Richard Harshman, Indexing by latent semantic analysis, Journal of the American Society for Information Science, 41, 6, 1990, pp. 391–407).

In the LSI method, documents are modeled by vectors in the same way as in Salton's vector space model. We represent the relationship between the keywords and documents by an M-by-N matrix A, with i,j-th entry $a_{i,j}$ i.e., $A=[a_{i,j}]$. The column vectors of A represent the documents in the database. Next, we compute the singular value decomposition (SVD) of A:

$$A=U\Sigma V^T; \Sigma=\text{diag}(\sigma_1, \sigma_2, \ldots, \sigma_{min(M,N)})$$

Then a modified matrix $A_d$ is constructed from the d largest singular values $\sigma_i$; i=1, 2, . . . d, and their corresponding vectors:

$$A_d=U_d\Sigma_d V_d^T,$$

where $\Sigma_d$ is a diagonal matrix with monotonically decreasing diagonal matrix with diagonal entries $r_i$ that are the singular values of A.

$$\Sigma_{d=diag(\sigma 1, \sigma_2, \ldots, \sigma_d)}$$

$U_d$ and $V_d$ are matrices with columns that are the left and right singular vectors of the d largest singular values of A. Details on implementation of the singular value decomposition are available in standard texts on matrix computations, such as Demmel (1997) and Golub and Van Loan (1989).

Processing the query takes place in two steps: projection, followed by matching. In the projection step, input queries are mapped to pseudo-documents in the reduced query-document space by the matrix $U_d$, then weighted by the corresponding singular values $r_i$ from the reduced rank singular matrix $\Sigma_d$.

$$q \rightarrow^{bar}q = q^T U_d \Sigma_d^{-1},$$

where q represents the original query vector, q represents the pseudo-document, and $q^T$ represents the transpose of q.

In the second step, similarities between the pseudo-document q and documents in the reduced term document space $V_d^{-1}$ are computed using any one of many similarity measures. A review of linear algebra techniques for information retrieval is Berry, Dumais and O'Brien (1995).

<Covariance-matrix-based Method (COV)>

The COV method has been developed by Kobayashi, Malassis and Samukawa (Mei Kobayashi, Loic Malassis, Hikaru Samukawa, Retrieval and ranking of documents from a database, IBM Japan, docket No. JP9-1000-1044, filed Jun. 12, 2000; Loic Malassis, Mei Kobayashi, Statistical methods for search engines, IBM Tokyo Research Laboratory Research Report, RT-413, 33 pages, May 2, 2001). The COV method is used for reducing the dimension of information retrieval systems based on vector space modeling to facilitate real-time query and retrieval. Their method will be briefly described as follows:

Step 1: Given a very large database, the set of all M documents $\{\Delta_i: i=1, 2, \ldots, M\}$ of which have been modeled as vectors having N keywords. Construct (implicitly or explicitly) the covariance matrix A associated with the set of all documents $\{D_i\}$, where A, $\Delta$ and $\Delta_i$ are defined as:

$$A = (1/M) \left[ \Sigma_{i=1, 2, \ldots, M} \Delta_i \Delta_i^T \right] - \Delta \Delta^T,$$

$$\Delta_i^T = [a(i,1) a(i,2) a(i,3) \ldots a(i, N)]^T,$$

$$\Delta^T = [\Delta_1 \Delta_2 \Delta_3 \ldots \Delta_N]^T, \text{ and}$$

$$\Delta_j = (1/M) \Sigma_{i=1, 2, \ldots, M} a(j, i),$$

respectively, where "T" denotes transpose of the matrix.

Step 2: Compute the top d eigenvalues $\lambda_j$; $j=1, 2, \ldots, d$, of the covariance matrix A and their corresponding eigenvectors $v_j$; $j=1, 2, \ldots, d$.

Step 3: To reduce the dimension of the relevancy ranking problem from N-dimensions to d-dimensions, where $d \ll N$, project all of the document vectors into the subspace spanned by the d eigenvectors $v_j$; $j=1, 2, \ldots, d$. This computation is quite heavy for very large databases so it should be performed beforehand, e.g., as an overnight job, and not on-line while the user is waiting.

Step 4: Project each user-input query into the subspace spanned by the d eigenvectors $v_j$; $j=1, 2, \ldots, d$, then perform relevance ranking with respect to the document vectors using some similarity measure, e.g., the angle defined by the query vector and each document vector.

The LSI method reduces the retrieval and ranking problem to one of significantly lower dimension so that retrieval from very large databases can be performed more efficiently. Another dimension-reduction strategy due to Kobayashi et al. (2000), COV, uses the covariance matrix of the document vectors to determine an appropriate reduced-dimensional space into which to project the document vectors. The LSI method and the COV method are comparable methods for information processing information retrieval; for some databases and some queries, LSI leads to slightly better results than COV, while for others, COV leads to much better results. In the present invention, however, any other method for dimension reduction may be used as far as the hierarchy structure of the document-keyword vectors according to the present invention may be introduced.

B. Hierarchy Construction

In the present invention, a particular node can have one or more nodes designated as its parent nodes, and zero or more nodes designated as its child nodes. A node is connected to its parent nodes by means of parent pointers, and connected to its child nodes by means of child pointers. Herein the parameter p represents the maximum number of parent nodes that can be pointed to by a particular node, and the parameter c represents the maximum number of child nodes that can be pointed to by a particular node.

FIG. 2 shows a general procedure for constructing the hierarchy structure of the document-keyword vectors. The procedure begins at the step S32 after receiving the result of the S14 of FIG. 1 to assign the reduced dimensional document-keyword vectors randomly to the nodes of the hierarchy structure using, for example, a well-known random number generating program. Next, the procedure proceeds to the step S34, wherein the level of the top hierarchy is set to be 1. Hereafter SASH$_i$ denotes the i-th level of the hierarchy including the nodes. Next, the procedure proceeds to the step S36 to increment the number of the level L. Then the procedure proceeds to the step S38 and creates the connection between the higher level, i.e., L=1 and the lower level, for example, L=2 in the described embodiment. The process proceeds to the step S40 to determine L is equal to h. If so (yes), the levels are connected then the procedure passes the result to the next step to end. If not so (no), the procedure reverts to the step S36 and then repeats the steps S36–40 until the determination of the Step S36 provides an affirmative result.

FIG. 3 shows an example of construction of the hierarchy structure created according to the present invention. As described in FIG. 3, the document-keyword vectors are classified into each of the hierarchic levels "Level i", where i is a number that may range from 1 to a number h, which is roughly set to be $h = \log_2 n$ (n is the number of the nodes). The number of nodes at the i-th level is to be roughly $n/(2^{h-i-1})$; however, the present invention may include any number of hierarchic levels depending on a particular application of the present invention. The details of the construction procedure will be provided later.

The procedure proceeds to the step S38 wherein the number of the current hierarchic level is checked as to whether it matches the number of the last level. When there remain levels to connect (no), then the procedure diverts to the step S36 and repeats the computation for connecting the nodes. When there remain no levels to connect (yes), the procedure for the hierarchy construction proceeds to the step S40 and ends.

C. Sub-procedure for the Hierarchy Construction

FIG. 4 shows a sub-procedure included in the procedure for the hierarchy construction which is designated by the step S38. The step S38 connects the nodes between the adjacent levels. The procedure shown in FIG. 4 begins from the step S52 to determine whether or not the present L is equal to 2.

When L is equal to 2, the procedure proceeds to the step S78 and sets the top node as the unique parent node and guarantor of all nodes included in level 2. Then the procedure proceeds to the step S80 to set the nodes of the level 2 as the child nodes and dependents of the top node.

When L is not equal to 2, then the process proceeds to the step S54 to compute "near neighbors" P_{L−1}(v,p) included in the level L−1, wherein v represents the node in the level L, and p represents the parameter by which parent nodes included in the computation of distance to a particular child node is defined. The process of the step S54 will be described later in further detail. Then the process proceeds to the step S56 where each node of P_{L−1}(v,p) included in the L−1 level is set as a parent node of v. The procedure proceeds to the step S58 to set the node v in the Level L to be a tentative child node of the parent nodes included in the level L−1.

The process next proceeds to the step S60 and determines whether or not there are at most the c tentative child nodes of u for each node at the level L−1. If so (yes), the procedure sets all tentative child nodes as confirmed as the child nodes of u in the step S62. If not so (no), the procedure confirms a number of child nodes equal to c as the child nodes of the node u in the step S64, where the child nodes chosen to be confirmed are those that are closest to u in terms of the distance. The procedure proceeds to the step S66, where the process updates the number of parents which selects the child node v as its confirmed child for each confirmed child v.

The procedure proceeds to the step 68 and then determines, for each child node v at Level L, whether or not the node v is an orphan node, i.e., the node v is not confirmed by any node at the level L−1. If so (yes), the procedure proceeds to the step S70 and finds a guarantor g(v) from the nodes of the Level L−1, and then the process replaces the farthest parent node of v by g(v), and then sets the child node v as a child of the guarantor g(v). The procedure further continues to the step S76 and the child node v is registered to be a dependent of the guarantor g(v). If not so (no) in the determination of the step S68, the procedure proceeds to the step S72 and sets a guarantor g(v) to be the parent of the child node v which is the closest in distance to the child node v and then the process diverts to the step S76 to register the child node v to be a dependent of the guarantor g(v).

The above registration of the parent-to-child relationships may be implemented using any well known technique, and for example, a document identifier, a distance identifier, and a node pointer for indicating the parent or child node may be added to the document-keyword vector and the connection or linkage may be established by referencing such identifiers, i.e., the node pointer, but not limited thereto, the present invention may be implemented by any technique to identify parents and child thereof.

FIG. 5 shows a graphical representation of the procedure shown in FIG. 4. As shown in FIG. 5, the construction of the SASH starts from the unique top node in the level 1. $SASH_i$ satisfies the conditions of the procedure described in FIG. 4. The construction of the entire SASH (that is, $SASH_n$) proceeds by iteratively constructing $SASH_1$, $SASH_2$, . . . , $SASH_h$ in order. FIG. 5 shows how to build $SASH_L$ given $SASH_{L-1}$, by adding edges from nodes of the current level to nodes of the level above, and vice versa. In the described embodiment in FIG. 5, for example, the parameter values are p=3 and c=12.

Now referring to FIG. 5, $SASH_1$ simply consists of a single node, the root node. If L=2, then every node of level 2 will have the root node as its sole parent and guarantor, and the root node will have all nodes of level 2 as its children and dependents. With each edge, the distance between its endpoints is stored. This completes the construction of $SASH_2$.

Otherwise, for the remaining steps, the number of the level is L>2. For each node v of level I, a set of up to p near neighbors $P_i$ (v, p) from among the nodes of each level $1 \leq i < I$, is determined as follows: Let $P_1$ (v, p) be the root node. $P_i$ (v, p) is generated by determining the set of all children of nodes of $P_{i-1}$ (v, p), and then selecting from this set the p distinct children closest to v. If fewer than p distinct children exist, then all children are chosen.

Next set the parents of v to be the nodes of $P_{i-1}$ (v, p). Each element v of level L now has p distinct parents associated with database elements in its vicinity, provided that level L−1 contains at least p nodes. With every parent edge generated, store the distance between its endpoints.

For each node u of level L−1, determine the list of distinct nodes C(u) of level L that have chosen u as a parent. Arrange the elements of C(u) according to their distances from u, in increasing order. If C(u) has more than c elements, truncate the list to contain the c elements closest to u. Set the children of u to be the nodes of C(u). The graphical representation of the above connection or linkage construction is depicted in FIG. 6.

In FIG. 6, the distances stored with each pointer to or from node u are determined in the present invention using the predetermined distance function. For each pointer to or from node u, the distance is that between node u and the other node from which the pointer originates or to which the pointer indicates. As described in FIG. 6, the connections from the parent node u to the child nodes are basically chosen with respect to the magnitude of the distances. The node at level L that select u as a parent are candidates for receiving a connection from u; however, only the c candidates with smallest distance from u will be chosen for the connection. In FIG. 6, the node with distance 3.3 to u and the node with distance 3.7 to u are not confirmed as child nodes of u because their distance to u are larger than the distance from u to the other nodes shown, and because the number of those other nodes is equal to c.

FIG. 7 shows exemplary distance functions useful in the present invention. The distance function may be selected from among those functions which satisfy the triangle inequality, but is not limited thereto. The present invention may adopt any function defined by two numerical data, provided that a hierarchy structure is obtained that enables sufficient accuracy in the information retrieval, etc.

Again referring to FIG. 5, for each node v of level L, determine whether it was accepted as a child of any node at level L−1. If yes, then the closest node that accepted it as a child becomes the guarantor of v. Otherwise, the node v becomes an "orphan" node. For the orphan node, it is required to find or register a node at level L−1 as a "guarantor" of v to ensure that the orphan node can be retrieved. The guarantor node should be reasonably close to v in the distance and be "unencumbered"; that is, it must have fewer than the maximum allowed number of child nodes c so that the orphan node can be added as a new child of the guarantor node without exceeding the limit c.

For this purpose, as described above, the inventors succeeded in successively widening the set of near neighbors to v by computing $P_{i-1}(v, p^2)$, $P_{i-1}(v, 2p^2)$, . . . , $P_{i-1}(v, 2^i p^2)$, . . . until an unencumbered node at level L−1 is discovered. If more than one unencumbered node is discovered, then the one closest to v is chosen to be the guarantor g(v) of v. Node v is added to the list of children of g(v), and the parent of v furthest from v is replaced by g(v). The procedure for finding the neighbors is described in FIG. 8.

The procedure shown in FIG. 8 describes the detailed step of the step 54 in the FIG. 4. The procedure of FIG. 8 begins from the step S90 after the output from the step S52 is received and sets P_1 (v,k) to be the top node of the hierarchy. Next the procedure sets a level indicator i=1 at the step S92 and the indicator is increased to the next level at the step S94. Then the procedure proceeds to the step S96 to set P'_i(v) to be the previously determined set of distinct child nodes of the nodes of P_{i−1}(v,k). The procedure next proceeds to the Step S98 to determine whether the number of the neighbor nodes of P'_i(v) is not more than a predetermined value k.

Again referring to FIG. 8, the process proceeds to the step S100 if P'_i(v) is equal to k or less than k (yes) and sets P_i(v,k)=P'_i(v); and if not (no), the process proceeds to the step S102 and sets P_i(v,k) to be the k elements of P'_i(v) closest to v, to limit the number of the children nodes. After the steps S100 and S102, the procedure proceeds to the step S104 to determine whether or not the indicator i is equal to b (=L−1). If so (yes), the procedure proceeds to the step S60 of FIG. 4 and if not so (no), the process reverts to the step S94 to increment i and then repeat the steps S96–S104.

FIG. 9 shows a procedure for searching for the orphan guarantor g(v) described in the step S70. As described in FIG. 9, the procedure for guarantor search starts from the step S110 after receiving the result of the step S68 and sets $k=p^2/2$ so as to widen the search range for the orphan within the limit of the number of the nodes in the adjacent higher level. Then the process multiplies k by a factor 2 in the step S112 to widen the search range while keeping the search range less than at most the number of the nodes in the higher level.

Next the procedure proceeds to the step S114 and computes candidate guarantor G=P_{L−1}(v,k) using the same procedure shown in FIG. 8 (find neighbor). Then the procedure proceeds to the step S116 to determine whether or not G includes an unencumbered node, i.e., one with fewer than c children nodes. If so (yes), the procedure proceeds to the step S118 to set g(v) to be the closest unencumbered node of G to the child node v and pass the result thereof to the step S74. If not so (no), the process reverts to the step S112 to widen the search range, and repeats the steps S114–S116.

D. Approximate Similarity-Based Ranking Query (step S18)

Given a query object q, where the user wants to find, for example, k=100 database elements from among the nearest neighbors of q. Using the SASH, as described above, computation of R=$P_0$ (q, k) U $P_1$ (q, k) U ... U $P_h$ (q, k) is executed, and then selection of the k elements of R closest to q to be the result of the query. The method guarantees that at least k elements will be returned, provided that the number of elements in the database is at least k.

FIG. 10 shows the detailed procedure for finding k-nearneighbor nodes. The procedure of FIG. 10 starts from the step S120 to compute neighbor sets and next proceeds to the step S122 to compute R=P_1 (q,k) U P2_(q,k) U ... U P_h(q,k). The procedure proceeds to the step S124 to determine whether or not the size of R is larger than k. If so (yes), the process proceeds to the step S126 to return the k nodes of R that are closest to the child node v to end. If not so (yes), the procedure proceeds to the step S126 to return the value R to end.

<Computer System and Data Structure>

Referring to FIG. 11, a representative embodiment of the computer system according to the present invention is described. The computer system according to the present invention may include a stand alone computer system, a client-server system communicated through LAN/WAN with any conventional protocols, or a computer system including communication through an internet infrabase. In FIG. 11, the representative computer system effective in the present invention is described as a client-server system networked via the internet.

The computer system shown in FIG. 11 comprises at least one client computer and a server host computer. The client computer and the server host computer communicate via the TCP/IP protocol; however, any other communication protocols may be available in the present invention. As described in FIG. 11, the client computer issues a request to the server host computer to carry out retrieval and ranking of the documents stored in memory managed by the server host computer.

The server host computer executes retrieval and ranking the documents of the database depending on the request from the client computer to generate a cluster or group of the documents with respect to the relevancy to the query. The result of the detection and/or tracking is then downloaded by the client computer from the server computer through the network so as to become available to a user of the client computer. In FIG. 11, the server computer is described as the Web server, but is not limited thereto. Server hosts in any other types may be used in the present invention insofar as the computer system provides the above described function.

The server computer includes several functions for achieving the processing according to the present invention. The functions may be constructed by a suitable program for working the server computer to serve such functions using hardware resources implemented in the server computer. These means may be listed as follows:

(i) means for reducing dimension of the matrix to a predetermined order to provide a dimension reduced matrix;

(ii) means for randomly assigning vectors of said dimension reduced matrix to a set of nodes;

(iii) means for constructing a hierarchy structure of said nodes;

(iv) means for determining parent nodes and child nodes thereof between adjacent hierarchy levels;

(v) means for generating relations between said parent nodes and said child nodes, (vi) means for providing a query to rank said nodes with respect to said query; and (vii) means for selecting said nodes to generate a cluster including said ranked nodes with respect to said query.

The computer system to which the method of the present invention is implemented may be used as the network system as described in FIG. 11. However, as described above, the computer system of the present invention may be implemented as a stand alone type computer system rather than the network system. A use of the computer system may select either the network system or the stand alone system depending on his/her particular usage.

FIG. 12 shows an example data structure of the document-keyword vector. The document-keyword vector shown in FIG. 12 may be stored in the database as the document-keyword matrix together with original documents. In another embodiment, the document-keyword matrix may be stored in an other storage space provided in the computer system as far as correspondence of the documents and the document-keyword matrix may be ensured.

The data structure shown in FIG. 12 comprises the document-keyword vector section, the document identifier section, distance recording section, and the node pointer section. The document-keyword vector section includes numeral elements of the document-keyword vector which is derived using the vector modeling and the document identifier section includes the document identifier docID used as reference for construction of the hierarchy structure and/or for referencing the document corresponding thereto upon a user request. The distance recording section includes the unique distance to the document-keyword vector used for constructing of the hierarchy structure; however, the distance recording section may not included in the data structure in the present invention, because once the hierarchy structure is constructed the distance is not necessarily used in the information retrieval procedure.

The node section includes the node pointer nodeID which is necessary for tracing the hierarchy structure according to the present invention. FIG. 12 also shows the detailed construction of the node pointer nodeID. The nodeID includes upper-lower pointers for the hierarchic levels as shown in FIG. 12. The upper pointer section further contains the parent node pointers pdocID1, ..., pdocIDp depending on the parameter p, and indicates the parent nodes to which the document keyword vectors is connected. The lower pointer section further contains the child node pointers cdocID1, ..., cdocIDc depending on setting of the parameter c and indicates the child nodes to which the document-keyword vector is connected.

In the described embodiment described in FIG. 12, the hierarchy structure is traced using such node pointers included in the data structure together with the elements of the document-keyword vectors; however, the connection indicator section may be constructed as another table such as, namely, "connector table" by adding the document identifier docID of the corresponding document-keyword vector while requiring another procedure for updating or downdating the connection table with respect to the updating or downdating of the documents in the database.

FIG. 13 shows function of each of the node pointers included in the above data structure. The method of the present invention traces and connects dynamically the nodes in the previously constructed hierarchy structure upon executing the information processing such as the information retrieval etc.

VARIATIONS OR OTHER EMBODIMENTS

There may be many possible variations or embodiments of the simple example presented above, both in terms of the SASH organization and the query search patterns. The variations or embodiments as described below are all expected to exhibit similar or further advantages, and are mutually compatible. It may be possible any combination thereof may be implemented simultaneously in the method according to the present invention.

Variation 1

Although the method as described elsewhere herein for determining a guarantor for orphan nodes is effective, in some settings it may be desirable to enforce a ceiling on the amount of computation performed. One way of doing this is to make use of the node-guarantor relationship. As every node has a unique guarantor node one level higher in the structure, the node-guarantor relationship forms a "guarantor tree" spanning the SASH. The guarantor tree can be used to find guarantor nodes of orphans found at level L, as follows:

(1) Whenever a guarantor u is assigned to a node v in Step 3E, then v is designated as a "dependent" of u. The edges of the guarantor tree are precisely the edges between guarantors and dependents.

(2) If v is the first orphan found at level L, then for every node w of $SASH_{L-1}$, consider the set S(w) of unencumbered nodes in the subtree of the guarantor tree rooted at w. Store with w an upper bound b(w) on the distance to the closest node in S(w), computed recursively as follows:
  i] If w is unencumbered and at level L−1, then set β(w)=0.
  ii) If w is encumbered and at level L−1, then set β(w) to be infinity.
  iii) If w is not at level L−1, then set β(w)=min {β(y)+dist(w, y)|y is a dependent of w}.

(3) From the root of the SASH, recursively search the guarantor tree for an unencumbered node u at level L−1, as follows.
  i) If the current node w is not at level L−1, then recursively search the subtree of the dependent y of w that minimizes β(y)+dist(w, y).
  ii) If the current node w is at level L−1, then w must be unencumbered: the condition c≧3p ensures this.
  iii) Set u to be the guarantor of v as described above. Recursively update the values of β(w) for every ancestor w of u in the guarantor tree, using the rules set out in Step 2.

The above method will find guarantors for orphans in overall time proportional to at most n log₂ n. However, the guarantor it finds for node v will in general not be as close to v as the guarantor found using the method described in Step 3E of the Example.

Variation 2

Many metric search structures (including the M-tree) allow the possibility of avoiding some of the distance computations by making use of those distances stored along the edges of the structure at the time of its construction. One example of this, mentioned in the review of M-trees in the Prior Art section, is the use of the covering radius to eliminate subtrees that cannot possibly contain elements satisfying the query. Such techniques can also be applied to the computation of $P_i$ (v, p), as well as the computation of queries. Since the technique is widely used in metric searching of the information processing, we inventors hereby will describe only briefly how a SASH can make use thereof. For more details of applicability, for example, Ciaccia et al., op. cito., provides more detailed explanations.

Let $C_i$ (v, p) be the set of children (at level i) of the nodes of $P_{i-1}$(v, p). Let o be a node of $P_{i-1}$ (v, p), and let x be a child of o. Assume that the distances from query point v to at least p distinct nodes of $C_i$(v, p) have already been computed, and that z is the element that achieved the p-th closest distance to v. The triangle inequality guarantees that $$\text{dist}(v, \chi) \geq |\text{dist}(v, \pi) - \text{dist}(\pi, \chi)|.$$

Consider the following condition:

$$|\text{dist}(v, \pi) - \text{dist}(\pi, \chi)| \geq \text{dist}(v, \omega).$$

Note that each of the three distances appearing in the condition have already been computed: dist(v, π) is available as a result of the computation of $P_{i-1}$ (v, p); dist(π, χ) is the distance stored along the SASH edge from o to x; dist(v, ω) is updated whenever a point of $C_i$ (v, p) is inserted into $P_i$ (v,p). By storing distances at the time they are first computed, testing the condition does not require any additional distance computations.

If the above condition is satisfied, then we can conclude that $$\text{dist}(v, \chi) \geq \text{dist}(v, \omega),$$

which in turn implies that adding x to $P_i$ (v, p) cannot improve the distance from the query to its p-th closest element in $P_i$ (v, p). In this case, χ may safely be rejected without ever having to compute its distance to the query element. Otherwise, if the condition is not satisfied, we must explicitly calculate dist(v, χ) as before.

Variation 3

As is common with many data structures, it is possible to have references to all database elements at the bottom (leaf) level of the search structure. In this case, a given database element would correspond to at most one node on any given level. The nodes at level L−1 could be generated by selecting roughly half the nodes of level L uniformly at random, and copying references to their database elements.

Variation 4

In the example, the number of nodes of level L−1 was set at roughly half the number of nodes of level L. This proportion a can be varied, and need not even be constant from level to level (although a should be chosen to be substantially greater than 1, for good performance). In order to prevent large numbers of nodes becoming orphans or encumbered, the constants p and c should be chosen such that ca is substantially larger than p. Also, the parameters p and c may themselves be allowed to vary from level to level.

Variation 5

In Step 4 of the simple example, instead of reporting the k elements of $P_1$ (q, k) U $P_2$ (q, k), ..., U $P_h$ (q, k) closest to the query object, a variable number of elements can be drawn from each level. For example, the closest k elements of the set $P_1$ (q, $k_1$) U $P_2$ (q, $k_2$) U ... U $P_h$ (q, $k_h$) could be reported instead, where $k_h$=3k, and $k_i$=max{2 $k_{i+1}$/3, p} for all $1 \leq i < h$.

This allows a larger proportion of the query search time to be spent on the largest samples of database elements, namely those located closer to the bottom of the SASH.

Variation 6

In the simple example, parent pointers are used only in the construction phase as an aid to determining child pointers, which are used in the performance of the similarity search. However, parent pointers can also be put to use at query time. Each of the sets $P_i$(q, k) generated could be expanded to include the children of all parents of all of the nodes of the original set. This would improve accuracy at the expense of query execution time.

Variation 7

Approximate range queries can be performed by iteratively computing approximate k-nearest-neighbor queries, for some increasing sequence k=$s_1$, $s_2$, $s_3$, .... For example, the size of the query could be doubled at each iteration ($s_{i+1}$, =$2s_i$ for i>1). The iteration continues until either an element outside the desired range is discovered (at which time all elements discovered to lie within the range are reported as the solution to the range query), or the entire database has been visited (which occurs only when most or all of the database elements lie within the query range).

Variation 8

Exact k-nearest neighbor queries can be computed using the guarantor tree described in Variation 1. At every node w, one can maintain the maximum distance from w to any of its descendants. With this information, any search method suitable for a generic metric search tree can be used; see for example Chavez et al. (1998) or Ciaccia et al. (2000) for details. As with exact similarity search on other metric tree structures, the exact query would still suffer from the "curse of dimensionality".

Variation 9

The choice of p, and to a lesser extent the choice of c, both influence the running time of the method—as they increase, the time and storage requirements increase, as well as the accuracy of the queries. Appropriate values may be determined experimentally based on the available storage and limits on the SASH construction time.

Variation 10

It is possible to increase the accuracy of any k-near-neighbor query by performing a K-near-neighbor query instead (for K>k), and then reporting the closest k elements of the result. Naturally, this would cause an increase in the execution time roughly proportional to the ratio of K over k. It is noted that this variation described herein as to be the method used in the practical implementations to achieve good trade-off between accuracy and query time.

The present invention will be explained by examples illustrating results of the information retrieval experiments. Again noted, the examples described herein below are only for the purpose of better understanding of the present invention rather than limiting true scope of the present invention.

EXAMPLES

The inventors have examined the present invention by applying a particular problem of information retrieval using sample databases consisting of a maximum of approximately 500,000 documents having approximately 9000 keywords. In the experiment, the methods according to the present invention were examined using three different distributions of data. In the description below, d is the desired dimension of the data set. The method of the present invention was implemented in a commercially available workstation with sufficient computation capacity. Experimental sample conditions are listed below:

(1) Data Sets

Uniform: For a given point, each of its d coordinates is an integer generated uniformly at random from a predetermined interval. The distance metric used is the Euclidean metric.

Cluster: Each data point lies in the vicinity of one of ten fixed cluster centers located within a predetermined hyper-rectangle; that is, each coordinate of each cluster center is an integer in the predetermined interval. The cluster center for a given data point is chosen uniformly at random, and then offsets are added to each coordinate to generate the point. The offsets are integers generated uniformly at random; to each coordinate, two such offsets are added. All offsets are generated independently from one another. The distance metric used is the Euclidean metric.

Reuters: A data set consisting roughly 100,000 points in 200 dimensions was generated using the COV dimension reduction method, from an original 8790-dimensional set of roughly 21,000 feature vectors representing occurrences of keywords in news articles from the Reuters news agency. From each of the feature vectors, 4 additional vectors by perturbing non-zero entries were generated.

Using the above conditions, for the purpose of assessing the performance of the SASH in handling similarity queries, the inventors have implemented and tested the SASH with respect to Variations 5 and 8. For comparison purposes, the inventors have also implemented the second and third M-tree-based methods proposed by Zezula et al. op. cito., as references of the conventional method as detailed in the Prior Art section. However, the inventors did not chose to implement the clustering-based method of Ferhatosmanoglu et al. op.cito., as their experimental results were sufficient as a comparison.

The methods tested were:

EXAMPLES

Sash3: SASH with node parent capacity p=3 and node child capacity c=12.

Sash4: SASH with node parent capacity p=4 and node child capacity c=16.

Sash5: SASH with node parent capacity p=5 and node child capacity c=22.

Sash10: SASH with node parent capacity p=10 and node child capacity c=40.

Comparable Examples

MTreeCR: M-tree with node capacity 5 and using a threshold on the convergence rate (Zezula et al.'s third method).

MTreeDD: M-tree with node capacity 5 and using estimation of query-to-element distance distribution (Zezula et al.'s second method) provided by a random sampling of the element-to-element distances. The sample size used was $n^{1.5}$, where n is the number of elements in the database.

MTreeDD+: As MTreeDD, but with all query-to-element distances precomputed and available to the method. Note that in practical situations this information is not available.

(2) Experiment 1: Accuracy Versus Time Trade-off

The first experiment compared the SASH methods to the MTreeDD+ method on the Cluster and Reuters data sets. The sizes of the Cluster data sets were 50,000 or 200,000, and their dimensions were 50 or 100. The size of the Reuters data set was 100,000, and the (reduced) dimension was 200. The query sizes (number of near neighbors requested) were 20, 50 and 100 in all runs. The structures were generated randomly: for the SASH, each data element was equally likely to appear at a given node; for the M-tree, the order of insertion of the nodes was performed uniformly at random. A set of query elements was also generated at random, using the same procedure as for the data elements themselves.

For each run, 10 query points were generated. The structure (SASH or M-tree) was constructed 10 times, and after each construction all 10 queries were executed repeatedly, for different choices of the parameter used to influence the trade-off between accuracy and time. For the SASH methods, the parameter varied was the query size (as described in Variation 10 earlier). For the MTreeDD+ method, the parameter varied was the rank threshold; however, since MTreeDD+ has access to the full list of distances from the query element to the database elements, choosing a rank threshold is equivalent simply to a direct choice of one of these distances.

In FIGS. 14–25, the outcomes of the experiment are shown as graphs of execution time (measured as the number of distance computations, the dominant operation in both the SASH and M-tree-based methods) vs. accuracy (measured as the proportion of the query result that would appear in the result of an exact k-nearest-neighbor query). To achieve a smooth graph, for each level of accuracy, the execution times of all queries achieving that accuracy over all 10 builds of the structure were averaged.

For this experiment, MTreeCR and MTreeDD were both represented by the MTreeDD+ method. The spectrum of outcomes produced by MTreeDD+ is the same as that which would have been produced by MTreeCR or MTreeDD, since both methods ultimately choose one of the query-to-element distances to determine their stopping criteria. However, MTreeCR and MTreeDD are less consistent in their choice of this distance for individual queries.

In FIG. 26, the results of the Sash3, Sash4 and Sash5 methods on the Cluster data set, with 100,000 points in 64 dimensions—the same size and dimensions as the largest set considered by Ferhatosmanoglu et al. (2001) in their experimentation. At the 90% accuracy level, for query sizes of 20, 50 and 100, the SASH methods achieved speed-ups of 15 to 20 times compared to the exact sequential method. Although their clustered data set is different, Ferhatosmanoglu et al. report a speedup of roughly 16 times at this level of accuracy.

(3) Experiment 2: Variance of Query Results

To estimate the variation in time and accuracy of the M-tree and SASH methods, the inventors experimented by running each of MTreeCR, MTreeDD1.25, and Sash10 on a Uniform data set consisting of 1,000,000 points in 50 dimensions. For each method, 100 query points were generated by choosing elements of the data set uniformly at random, and all 100 queries were then executed on the appropriate structures (M-tree or SASH). In all runs, the query size (number of near neighbors) requested was 100. As in Experiment 1, time was measured as the number of distance computations performed, and accuracy was measured as the proportion of the query result that would appear in the result of an exact 100-nearest-neighbor query. Compared to the Cluster and Reuters data sets, the Uniform data set has no clusters, and thus query results for this set would be expected to show less variation.

To demonstrate the ability of each method to obtain a target query result accuracy, the inventors attempted to determine a specific value of the parameter used to influence the trade-off between accuracy and time, so as to achieve a query result accuracy of 70%. For the Sash10 method, this parameter is the query size (as described in Variation 10 earlier). For the MTreeCR and MTreeDD1.25 methods, the parameter is the rank threshold. In a preprocessing step, 100 additional query points were generated for the purpose of training the parameter. Given a choice of parameter, the 100 training queries were executed, and the average accuracy of their results was determined.

Based on whether this average was greater than or less than the target accuracy of 70%, the parameter was adjusted upward or downward. Using binary search techniques to guide the iterative adjustment of the parameter, a value was chosen that achieved an average result accuracy for the training queries of as close to 70% as possible. Once determined, this parameter value was used for queries based on a different set of 100 data points.

FIG. 27 shows the results of this experiment. The MTreeCR method was unable to reach a query result accuracy of any more than 14%, regardless of the parameter value used. Both Sash10 and MTreeDD1.25 were able to achieve an average query result accuracy of roughly 70%; however, compared to MTreeDD1.25, Sash10 was much more consistent in its accuracy, and extremely consistent in the number of distance calculations performed.

The method of the present invention was examined by the experiment for a Cluster data set of 50,000 points in 50 dimensions. Here, the chosen target was 4000 distance calculations per query, and the methods tested were MTreeCR, MTreeDD1.5, and Sash3. Values of the search parameters were determined in essentially the same manner as when accuracy was the target. FIG. 28 and FIG. 29 show the results of the above experiment. In the case of MTreeCR, no choice of parameter could induce the method to spend an average of 4000 distance calculations per query. Again, the Sash3 method was consistent in its accuracy, and extremely consistent in the number of distance calculations performed.

The inventors further examined by executing the Sash3, Sash4, Sash5 and MTreeDD1.25 methods on the Reuters data set, with a target query result accuracy of 90%. The MTreeDD1.25 method was extremely inconsistent, with 82 runs achieving perfect accuracy with distance calculations ranging from roughly 37,500 to 85,000 (out of a maximum 100,000), and the other 18 runs attaining accuracies in the range 1% to 58% using distance calculations in the approximate range 8000 to 30,000.

In comparison, all three Sash methods showed a high degree of consistency in terms of the number of distance calculations. In terms of accuracy, the methods were less consistent. However, for all three, no more than 10 out of 100 query results had accuracy below 65%, and the majority of the queries achieved perfect accuracy. The results of this experiment are shown in FIG. 30 (MtreeDD1.25; reference) and FIG. 31 (present invention). The means and standard deviations of the accuracy and distance calculations appear in the table I described below:

TABLE I

|  | MTreeDD1.25 | Sash3 | Sash4 | Sash5 |
|---|---|---|---|---|
| Dist Calcs |  |  |  |  |
| Mean | 53,176.8 | 11,095.6 | 5,541 | 4,110.8 |
| Standard Dev. | 21,436 | 851.5 | 477.2 | 434.1 |
| Minimum | 8,166 | 9,527 | 4,783 | 3,339 |
| Maximum | 84,114 | 12,506 | 6,785 | 5,247 |
| Accuracy |  |  |  |  |
| Mean | 84.8 | 91.4 | 90.7 | 91.1 |
| Standard Dev. | 32.4 | 14.7 | 16 | 16.7 |
| Minimum | 1 | 39 | 21 | 27 |
| Maximum | 100 | 100 | 100 | 100 |

In summary, the present invention may significantly improve efficiency of the information processing technology; the improvements are summarized as follows:

Improvement 1: Scalability

Using Variation 5, the storage required by the SASH is proportional to pn. The number of distance comparisons required has an upper bound of approximately:

SASH construction: $pcn \log_2 n$

Approximate k-nearest-neighbor query: $9ck+c \log_2 n$

However, as the average number of children per node is less than 2p, in practice these bounds are closer to:

SASH construction: $2p^2 n \log_2 n$

Approximate k-nearest-neighbor query: $18pk+2p \log_2 n$.

The method scales very well with respect to n and k. The dimension d contributes only to the cost of an individual comparison. Thus, similarity measures that take time proportional to the number of dimensions d can be expected to contribute a factor proportional to d to the execution time (both query and construction). This is far better than the exponential dependence on d exhibited by classical vector-space methods.

Improvement 2: Estimation and Control of Execution Time

Given a fixed time limit for the execution of a query, the time bounds stated in Improvement 1 can be used to estimate the largest value K for which an approximate K-nearest-neighbor query can be performed. If the number of database elements requested k is less than K, then a K-query is executed, and the best k values are returned. In this way, the user is given the most accurate possible solution within the time limit. The estimation of K requires that the time of a single distance computation be known. Practically speaking, the execution time of the construction of the SASH can be used as a benchmark. The conventional methods for approximate similarity queries do not allow for such estimation and control.

Improvement 3: Accuracy vs. Execution Time Tradeoffs

Our experiments show that even when the M-tree-based methods are given the "unfair" advantage of full knowledge of the distances from the query point to the elements of the database, the SASH-based method greatly outperforms them. The tradeoffs are also superior to the conventional.

Improvement 4: Dependence on Knowledge of the Data Distribution

In the SASH, the location of each database element is made with respect to a sample of the data (that is, the set of nodes belonging to the levels above it in the hierarchical structure). The ability of the method to locate the point does not depend on the distribution of the data—it does not matter whether the data is uniformly distributed or has great variations in distribution. Unlike the conventional metric-tree-based methods, the present method does not require an estimate of the distribution of distances of elements to a given query element, nor does it rely on an unrealistic averaging of the distribution of distances of elements to a given database element. Unlike the conventional clustering method, the data does not need to have simple clusters of the sort that can be identified using k-means.

As described above, the present invention has been described with respect to the specific embodiments thereof. However, a person skilled in the art may appreciate that various omissions, modifications, and other embodiments are possible within the scope of the present invention.

The present invention has been explained in detail with respect to the method for retrieving and ranking as well as detection and tracking, however, the present invention also contemplates to include a system for executing the method described herein, a method itself, and a program product within which the program for executing the method according to the present invention may be stored such as for example, optical, magnetic, electro-magnetic media. The true scope can be determined only by the claims appended.

BRIEF DESCRIPTION OF DRAWINGS

The above objects and other advantages of the present invention will be understood by detailed description using particular embodiments depicted in the drawings; however, the present invention is not limited by the embodiments illustrated in the drawings.

FIG. 7 shows exemplary distance functions useful in the present invention.

Figure 1:
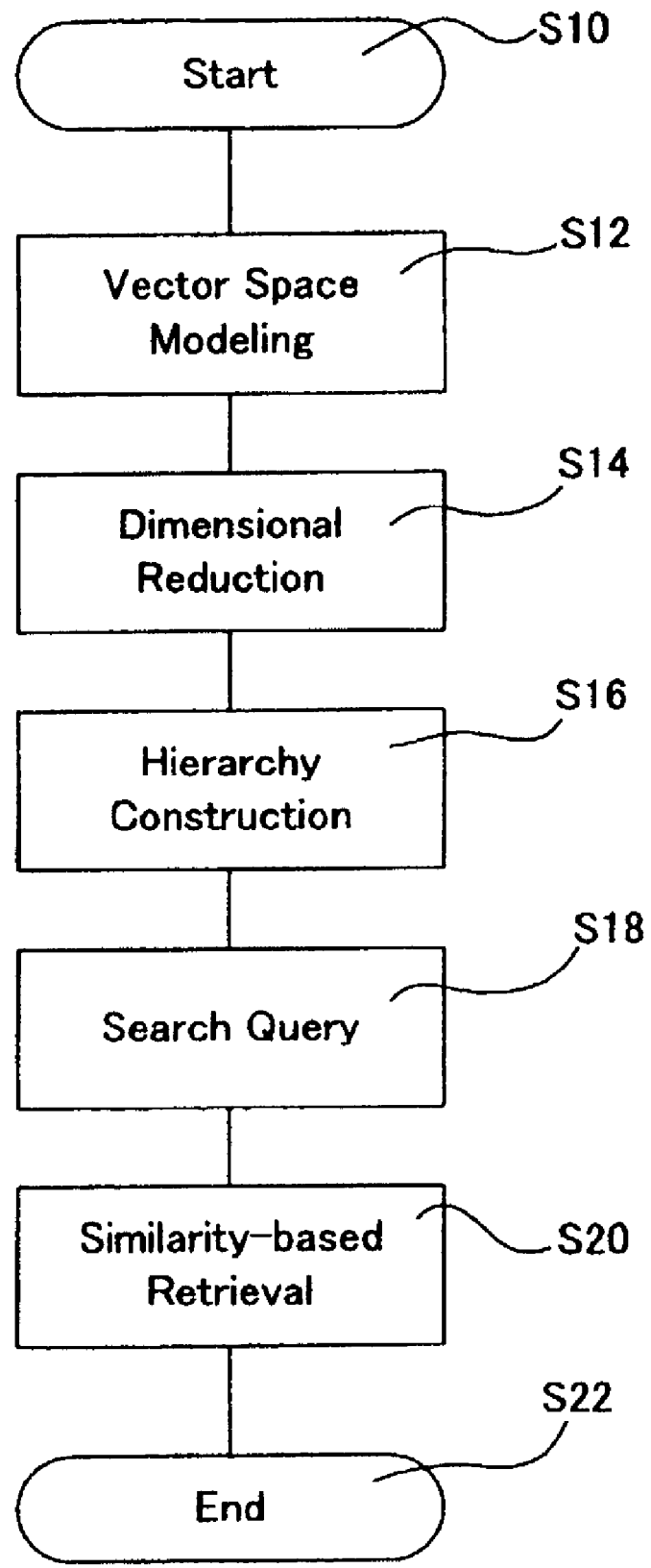
FIG. 1 shows a general method according to the present invention.
Figure 2:
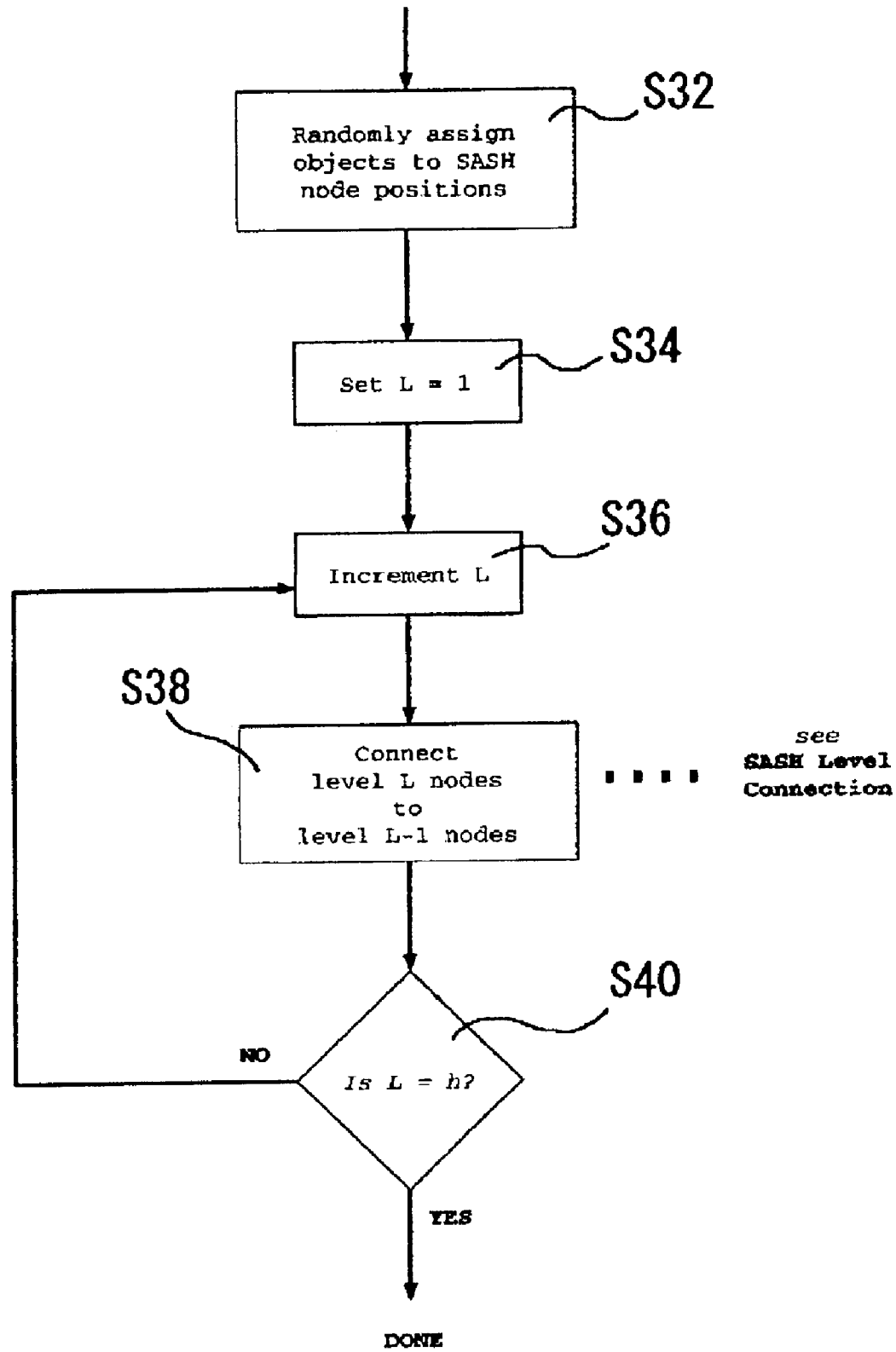
FIG. 2 shows a general procedure for constructing the hierarchy structure in the document-keyword vectors.
Figure 3:
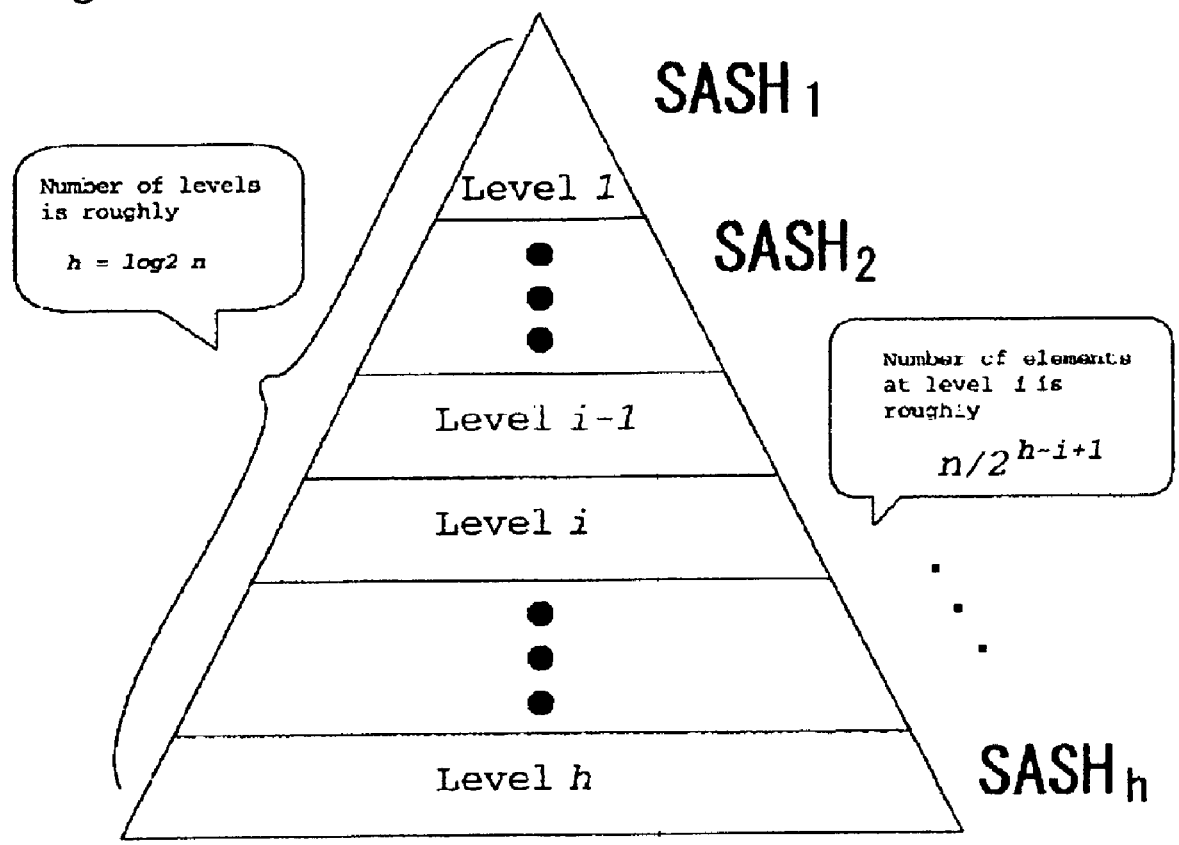
FIG. 3 shows an example of construction of the hierarchy structure created according to the present invention.
Figure 4:
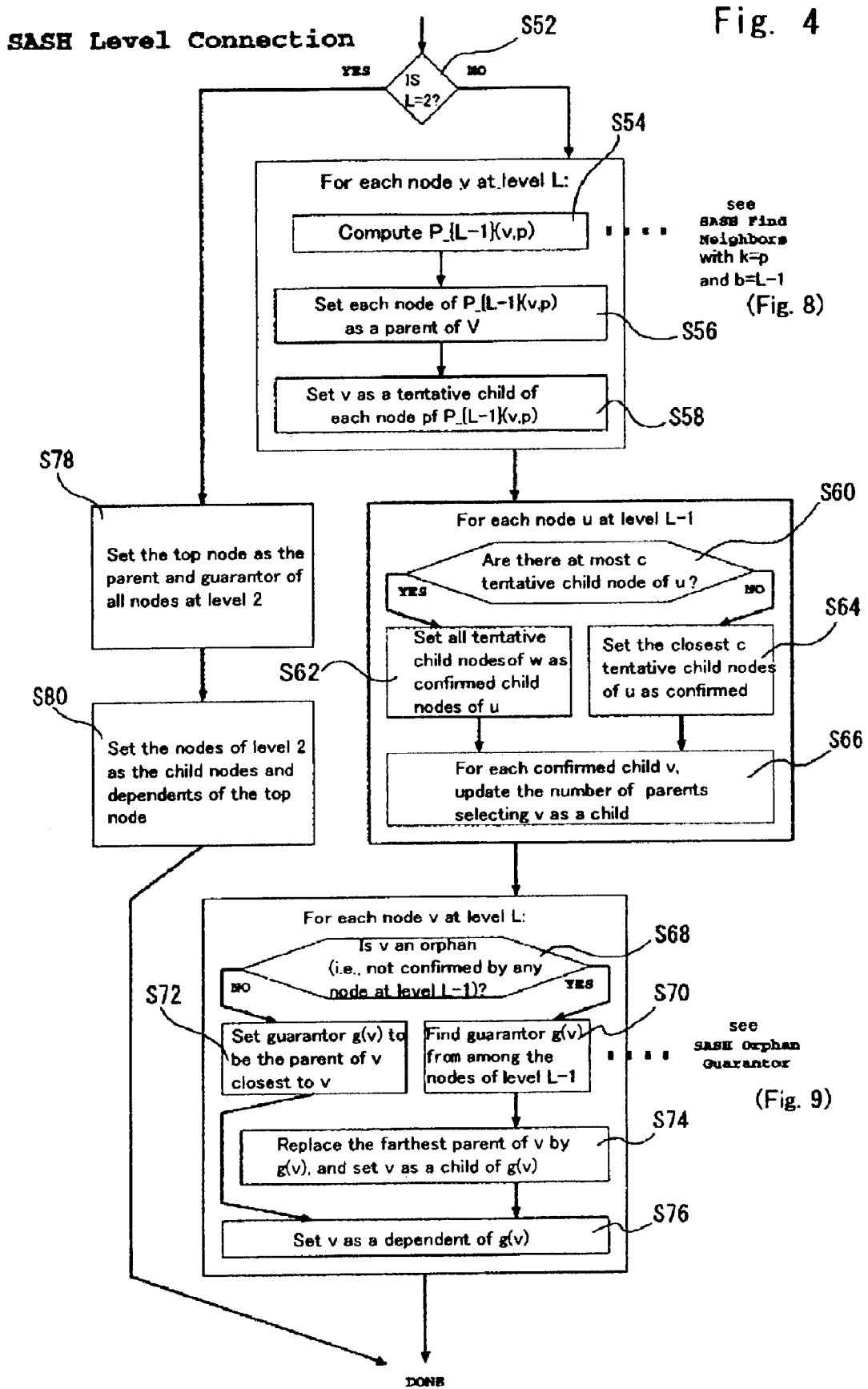
FIG. 4 shows a sub-procedure included in the procedure for the hierarchy construction shown in FIG. 2.
Figure 5:
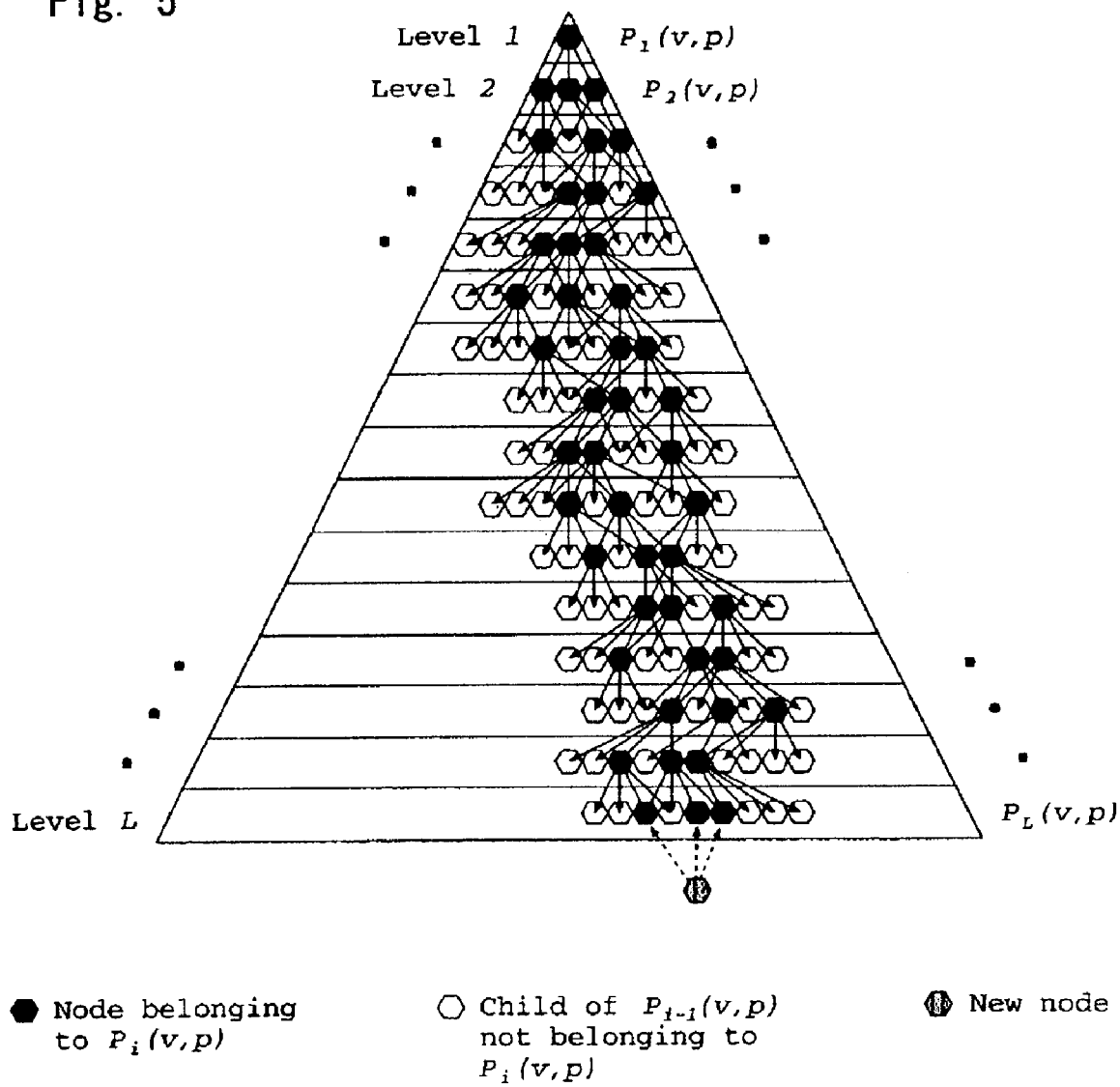
FIG. 5 shows a graphical representation of the procedure shown in FIG. 4.
Figure 6:
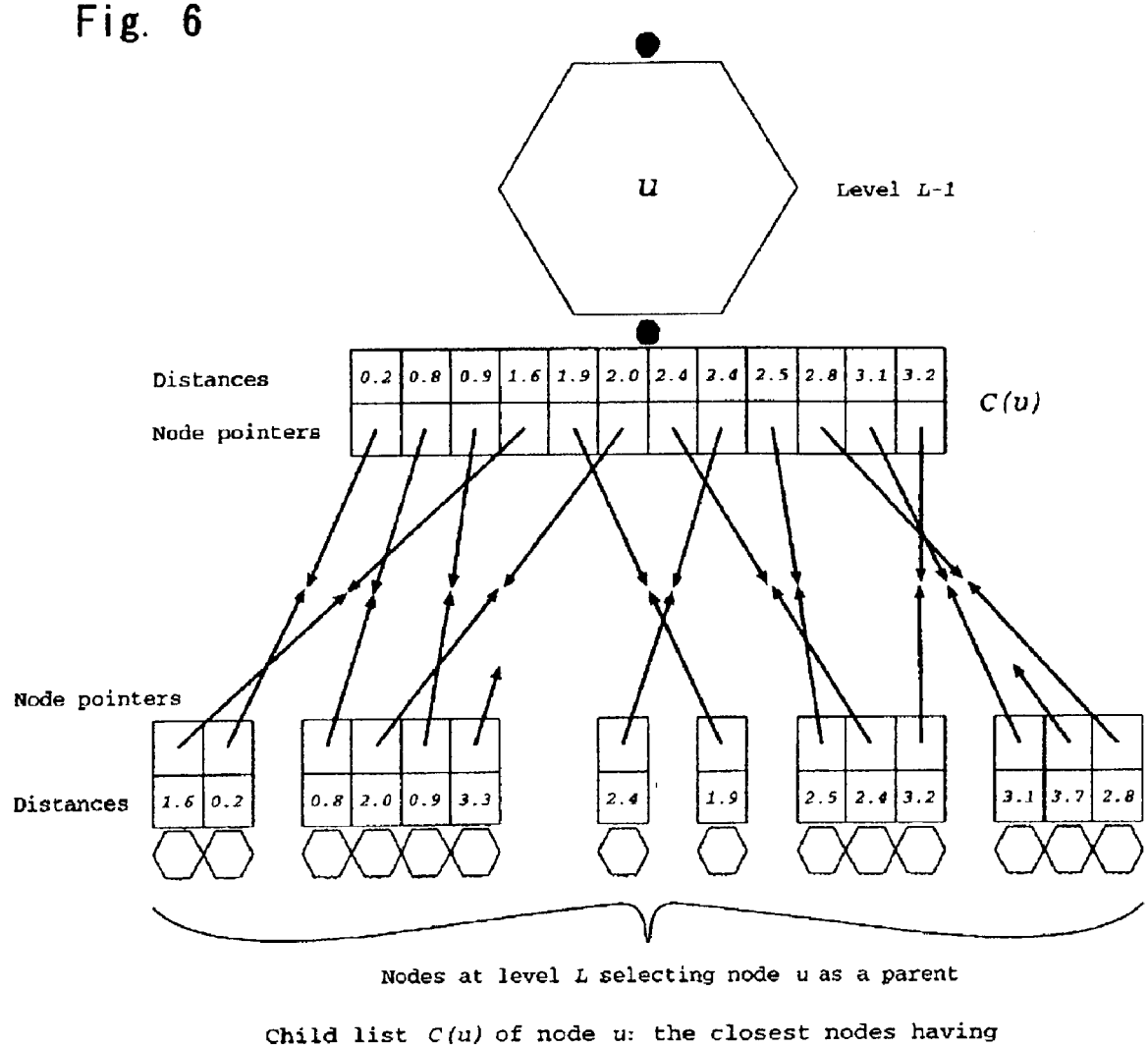
FIG. 6 shows the graphical representation of the above connection or linkage construction.
Figure 8:
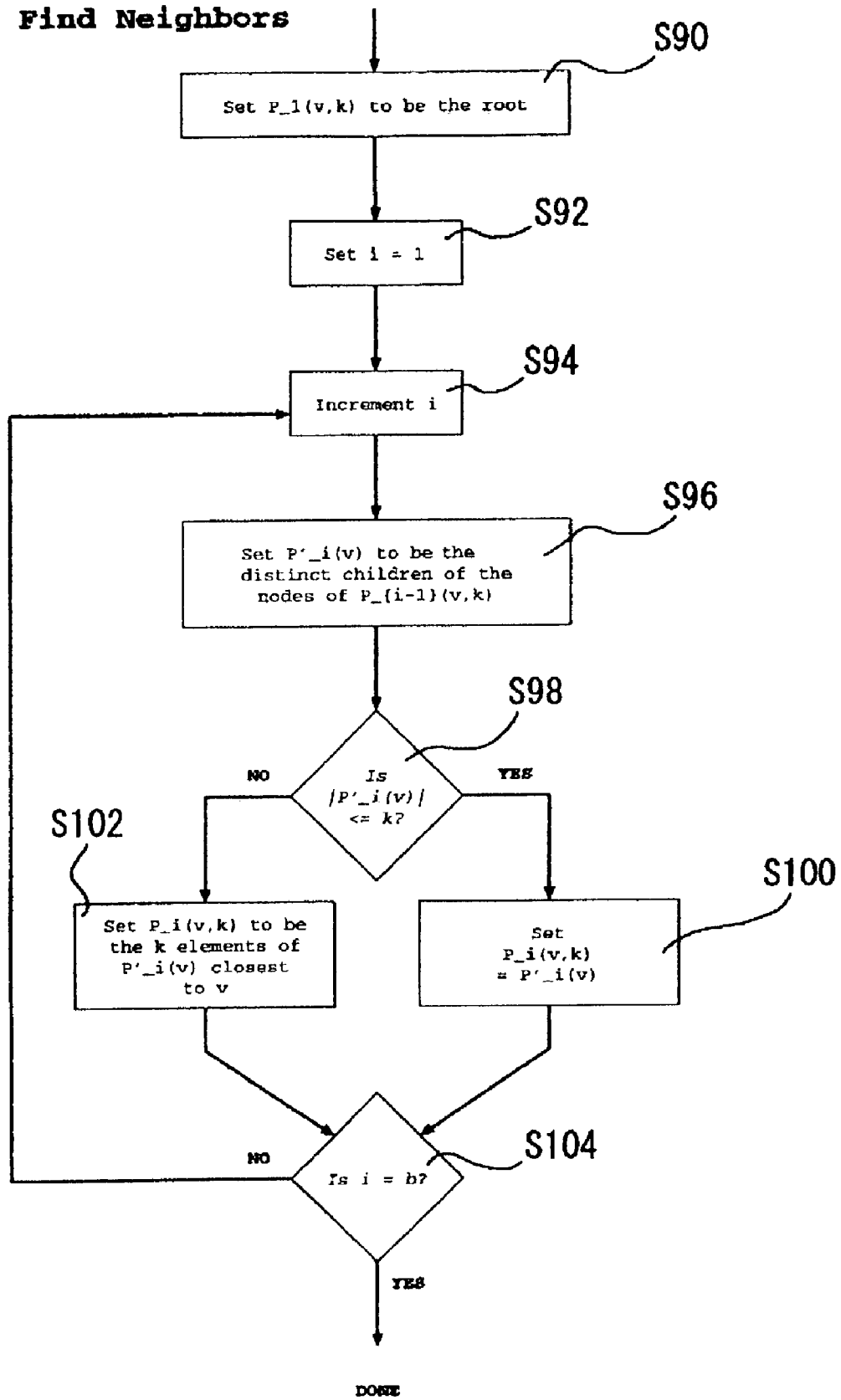
FIG. 8 shows a procedure for finding neighbors implemented in the present invention.
Figure 9:
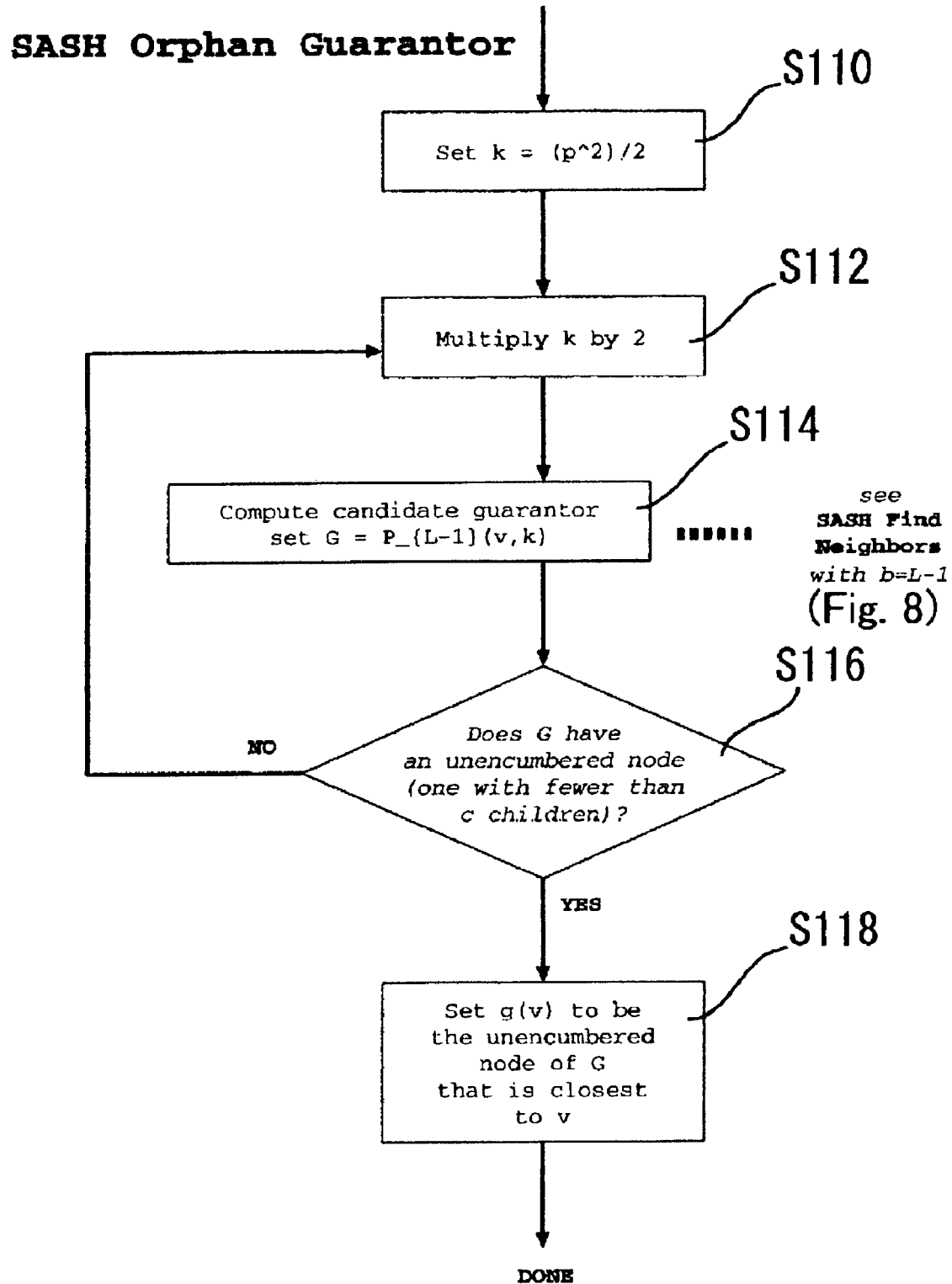
FIG. 9 shows a procedure for searching the orphan guarantor g(v) described in FIG. 4.
Figure 10:
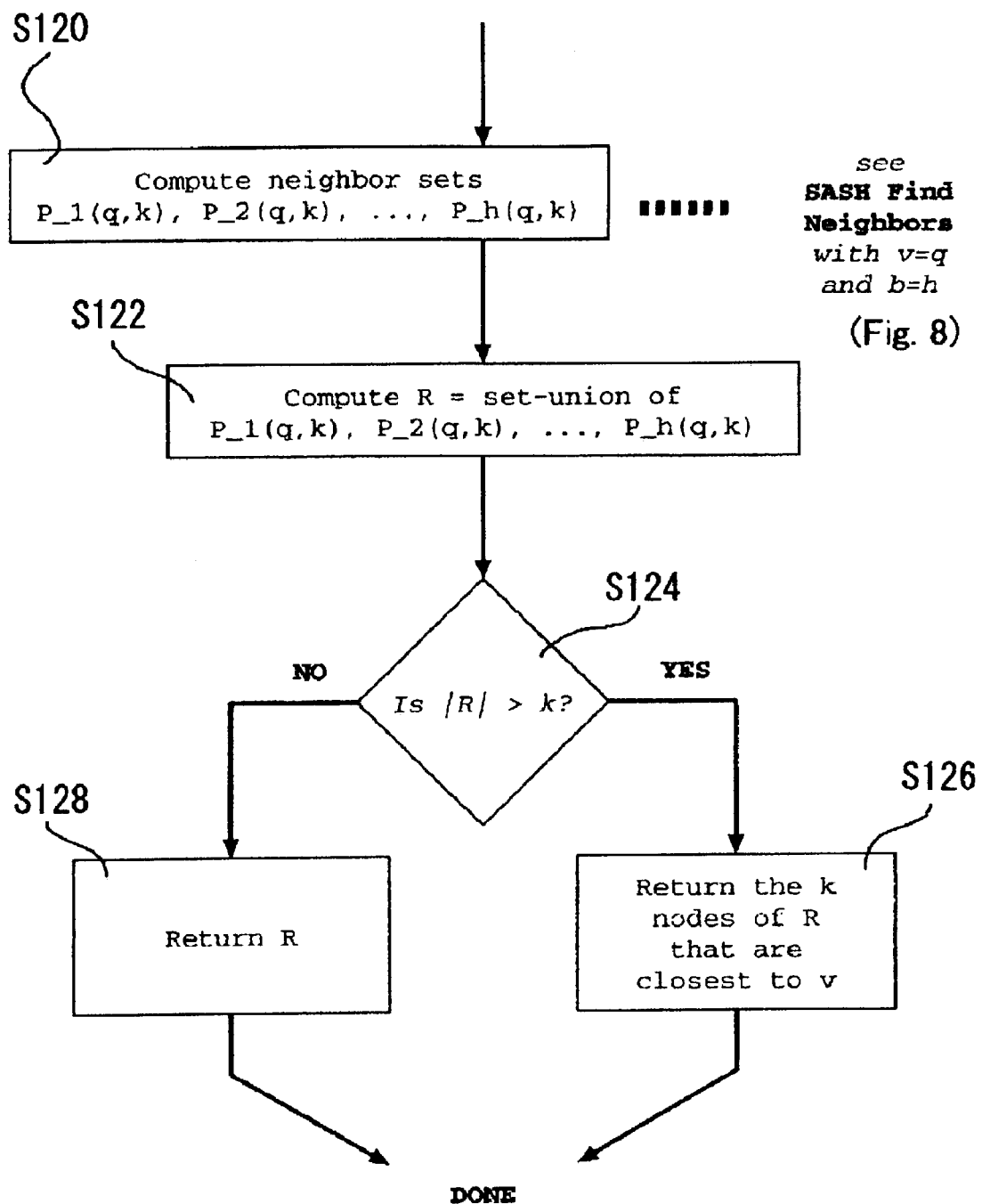
FIG. 10 shows the detailed procedure for finding k-near-neighbor nodes.
Figure 11:
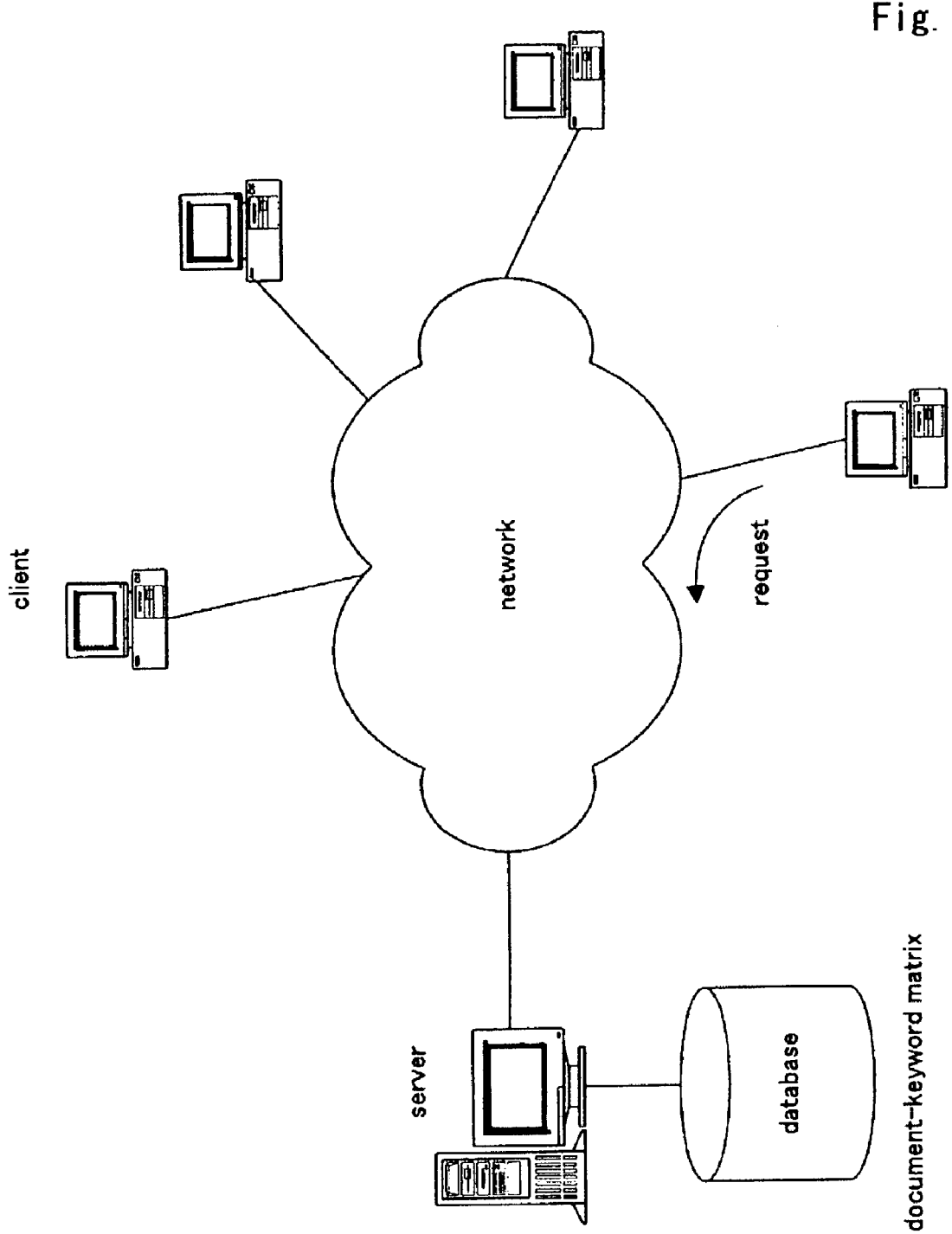
FIG. 11 shows a representative embodiment of the computer system according to the present invention.
Figure 12:
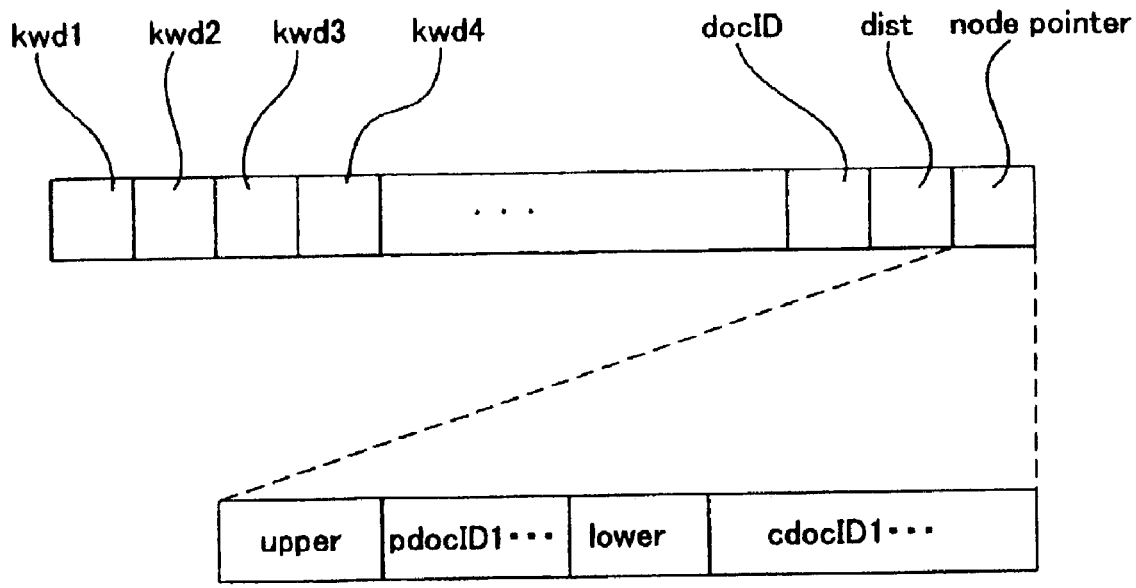
FIG. 12 shows an example data structure of the document-keyword vector.
Figure 13:
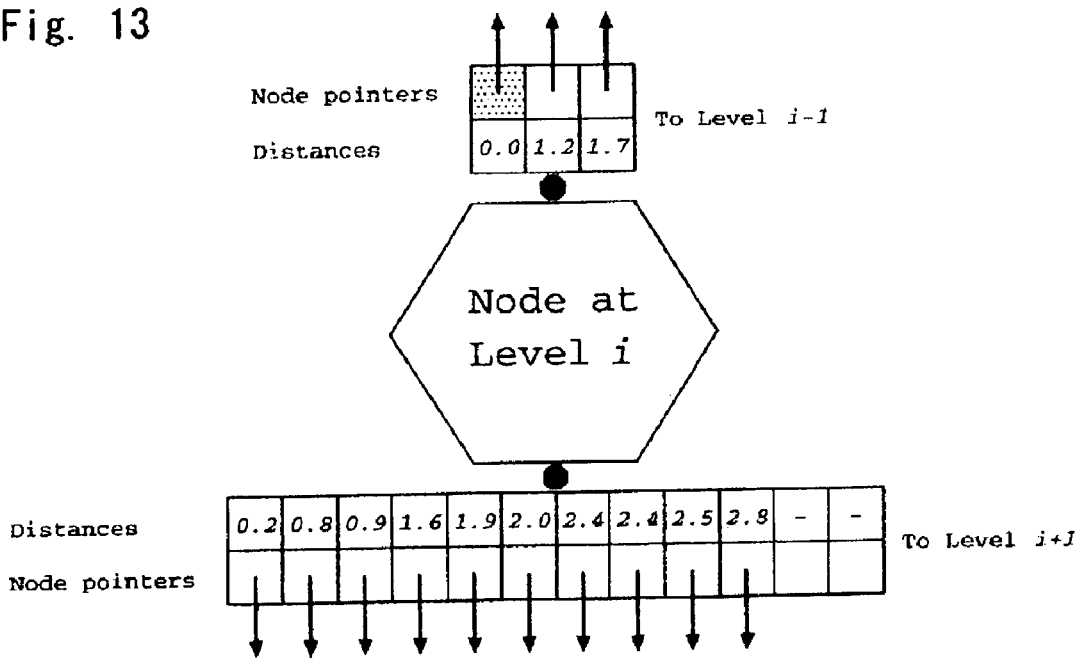
FIG. 13 shows the function of each of the node pointers included in the above data structure.
Figure 14:
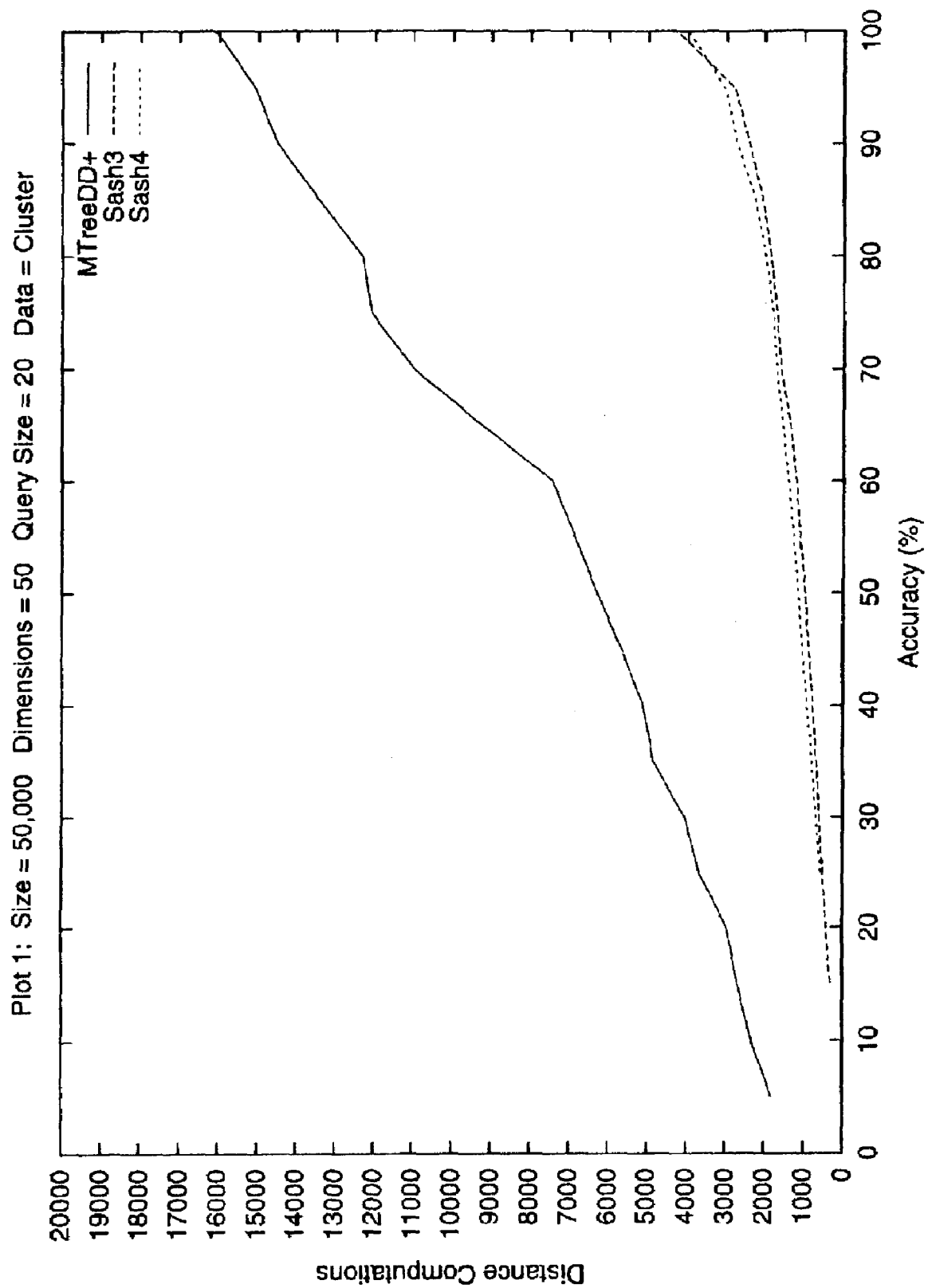
FIG. 14 shows results of the first experiment comparing the SASH methods to the MTreeDD+ method for query size 20 on a Cluster data set of size 50,000 and dimension 50.
Figure 15:
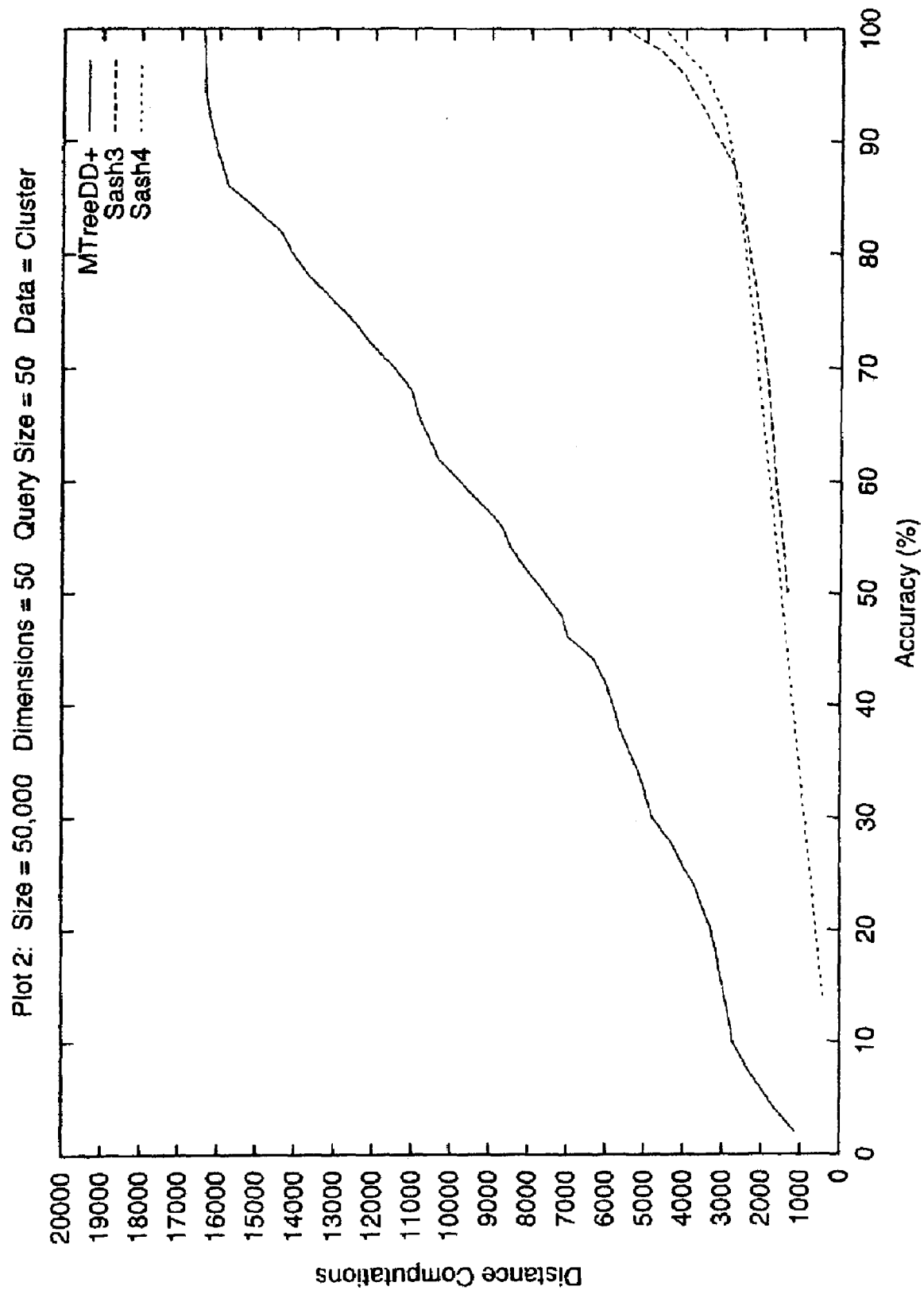
FIG. 15 shows results of the first experiment comparing the SASH methods to the MTreeDD+ method for query size 50 on a Cluster data set of size 50,000 and dimension 50.
Figure 16:
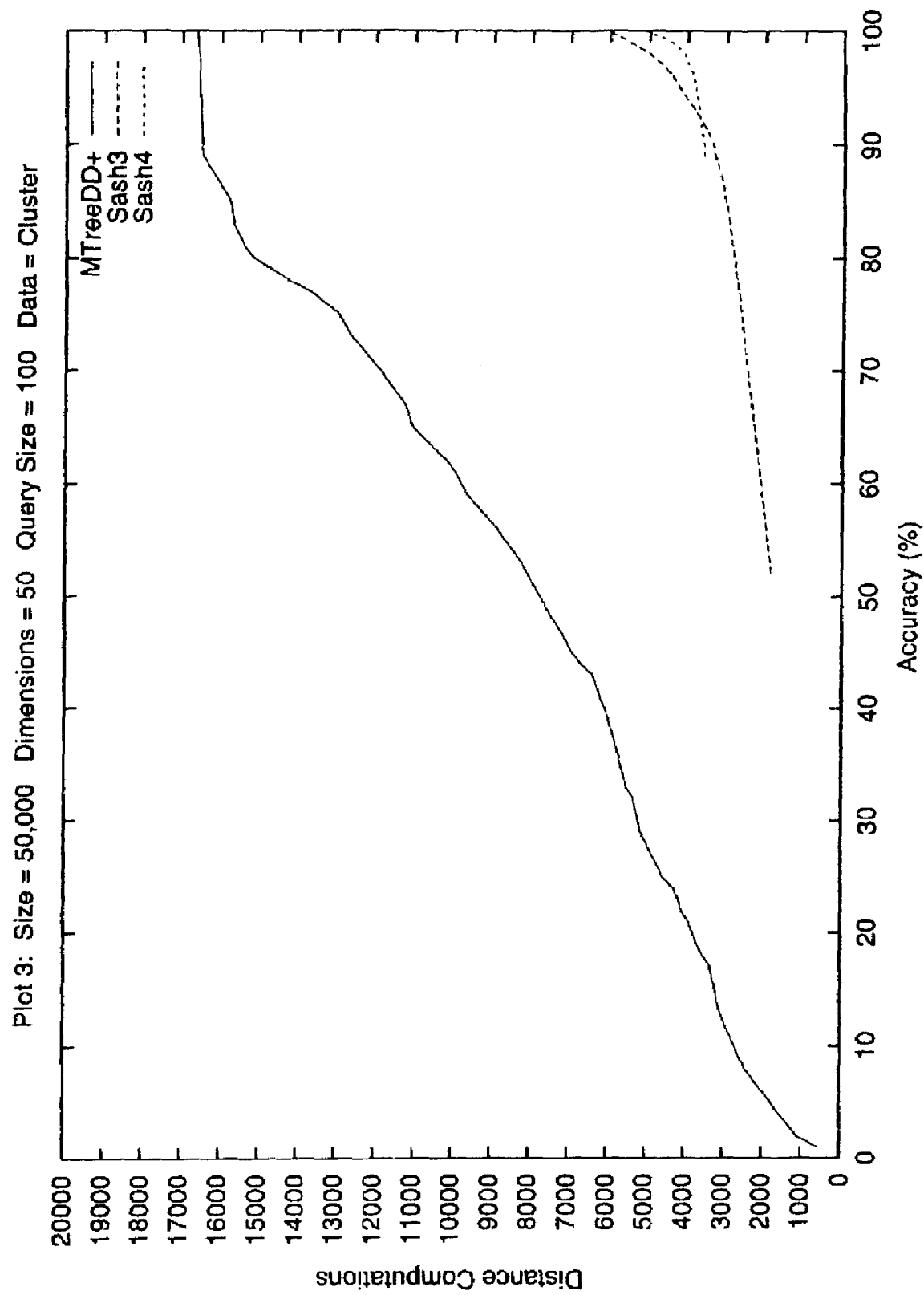
FIG. 16 shows results of the first experiment comparing the SASH methods to the MTreeDD+ method for query size 100 on a Cluster data set of size 50,000 and dimension 50.
Figure 17:
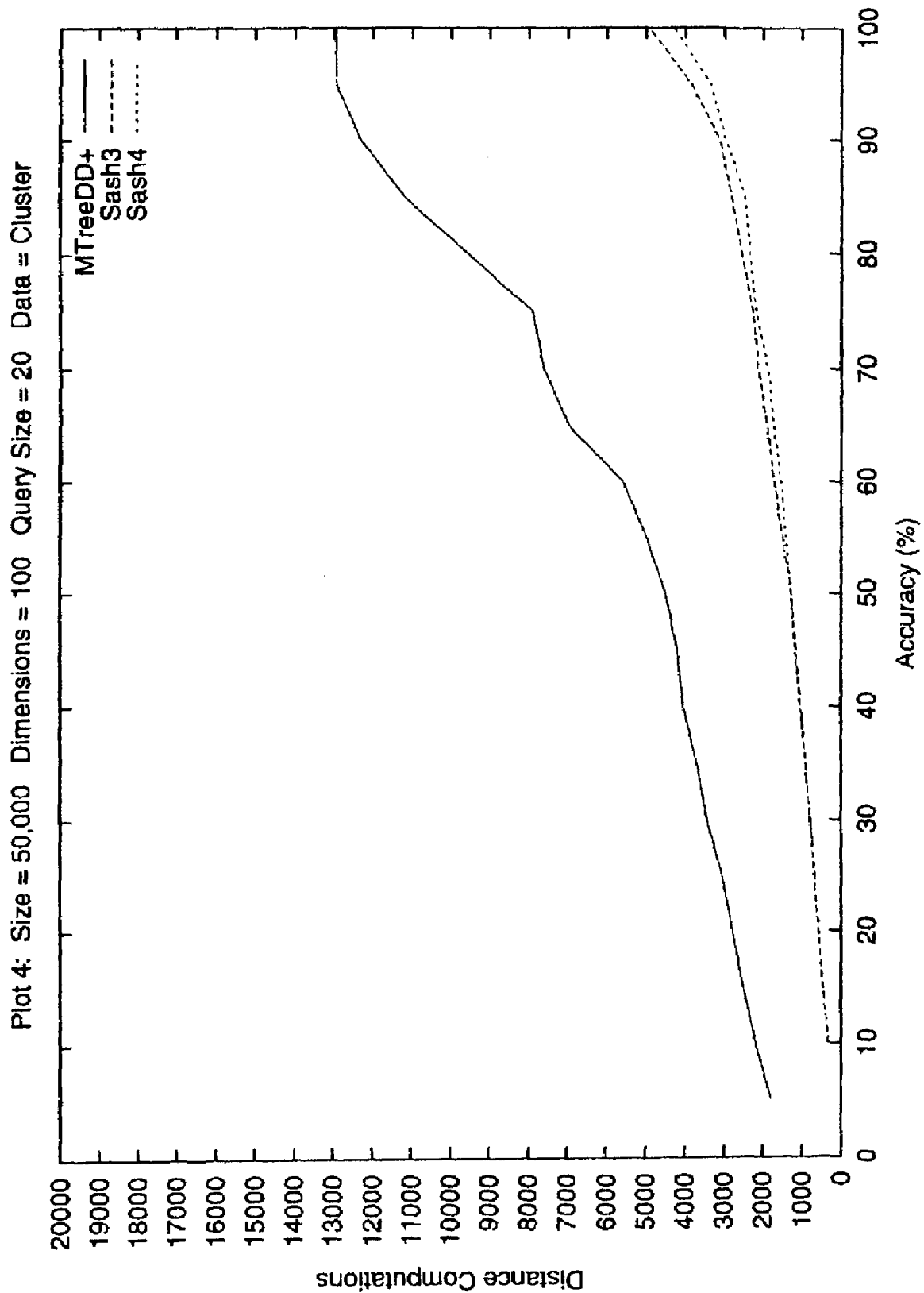
FIG. 17 shows results of the first experiment comparing the SASH methods to the MTreeDD+ method for query size 20 on a Cluster data set of size 50,000 and dimension 100.
Figure 18:
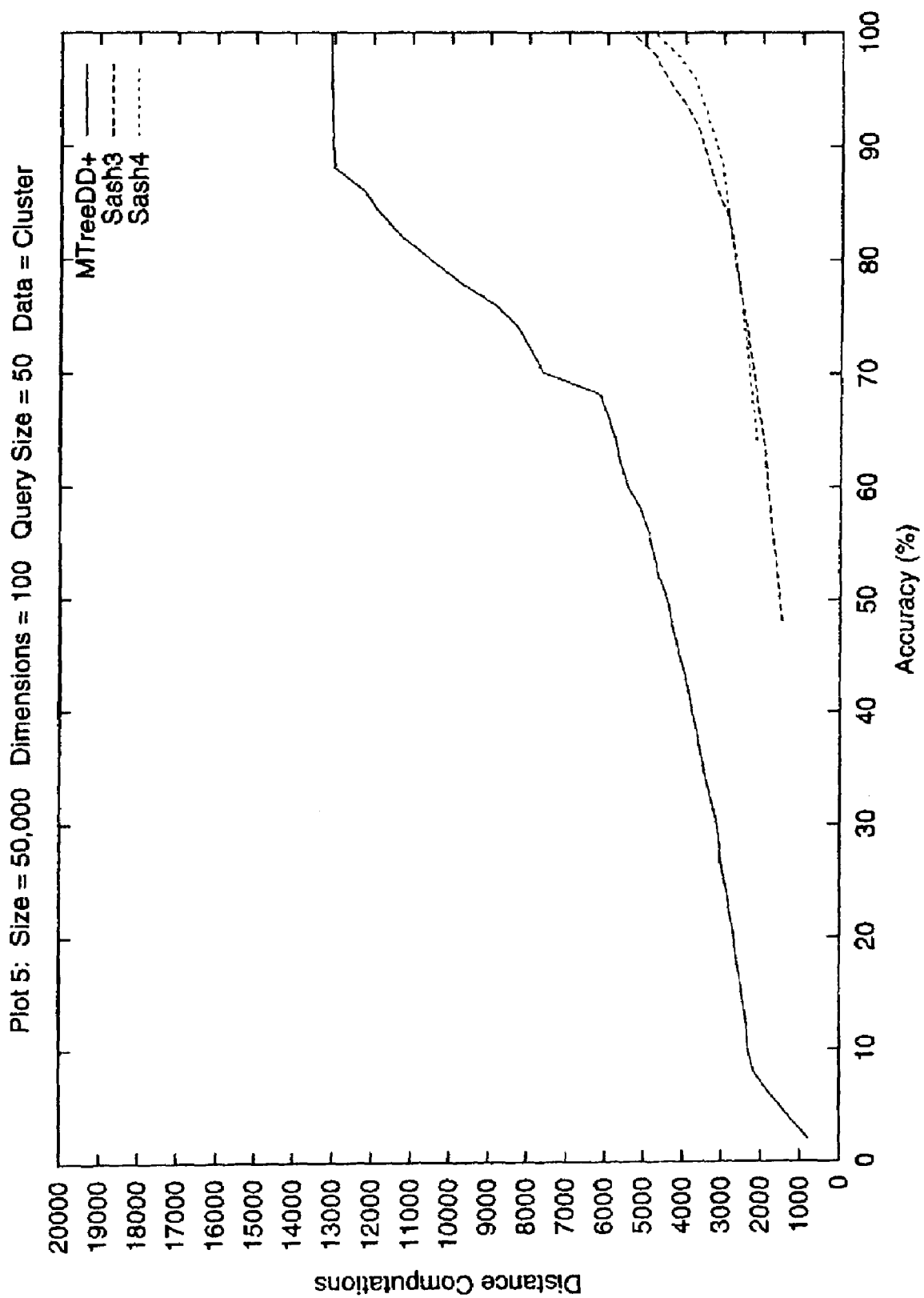
FIG. 18 shows results of the first experiment comparing the SASH methods to the MTreeDD+ method for query size 50 on a Cluster data set of size 50,000 and dimension 100.
Figure 19:
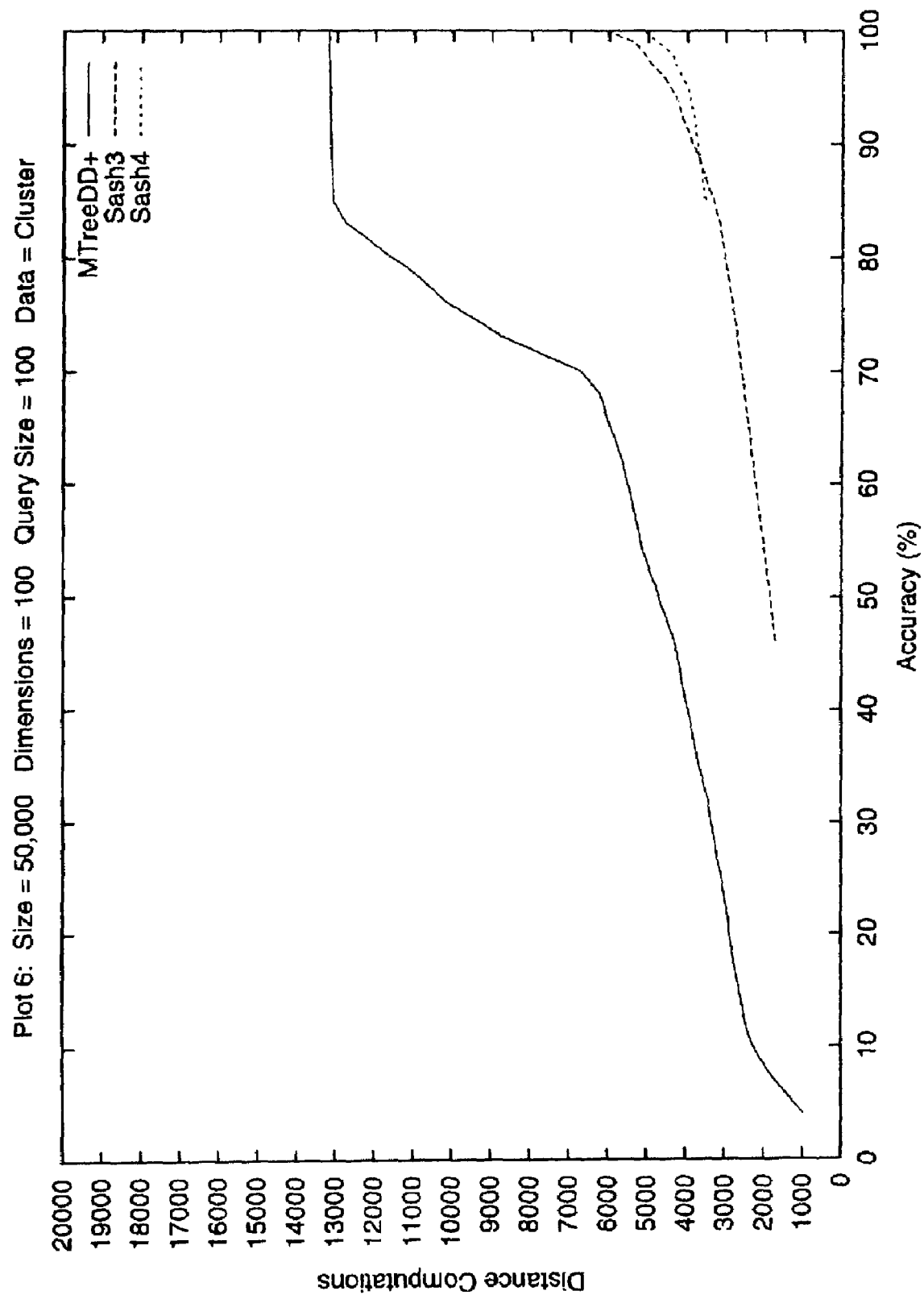
FIG. 19 shows results of the first experiment comparing the SASH methods to the MTreeDD+ method for query size 100 on a Cluster data set of size 50,000 and dimension 200.
Figure 20:
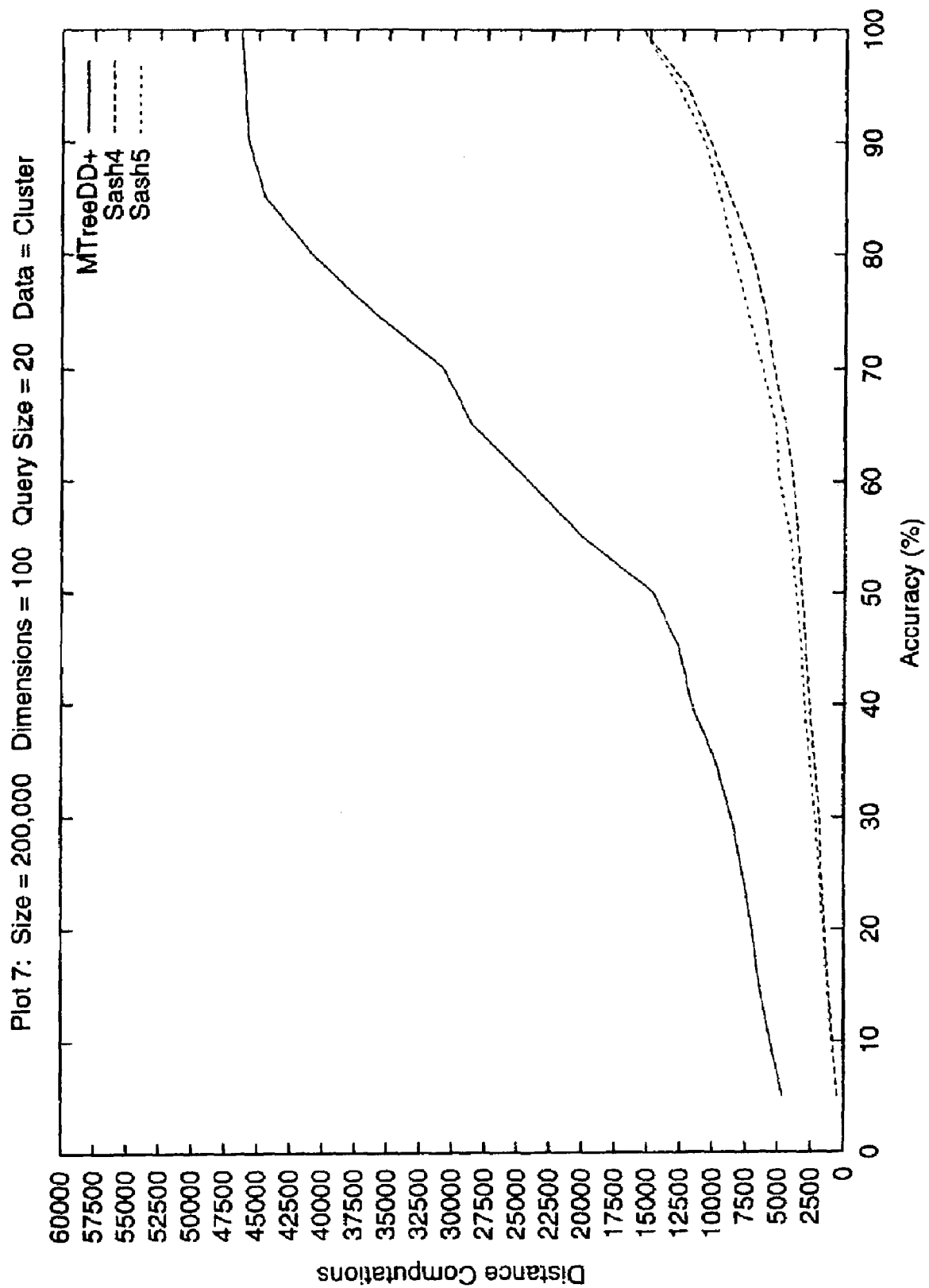
FIG. 20 shows results of the first experiment comparing the SASH methods to the MTreeDD+ method for query size 20 on a Cluster data set of size 200,000 and dimension 100.
Figure 21:
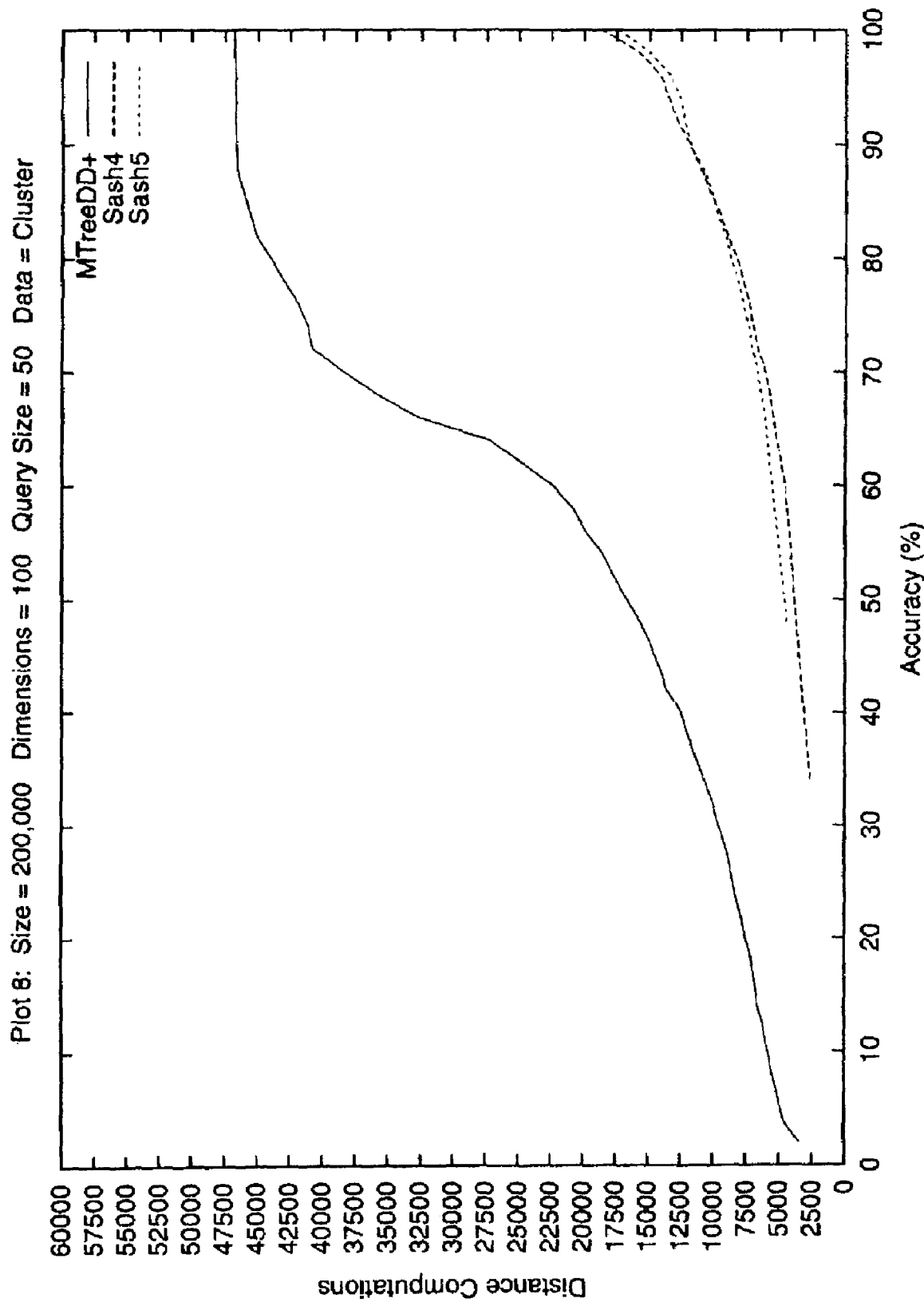
FIG. 21 shows results of the first experiment comparing the SASH methods to the MTreeDD+ method for query size 50 on a Cluster data set of size 200,000 and dimension 100.
Figure 22:
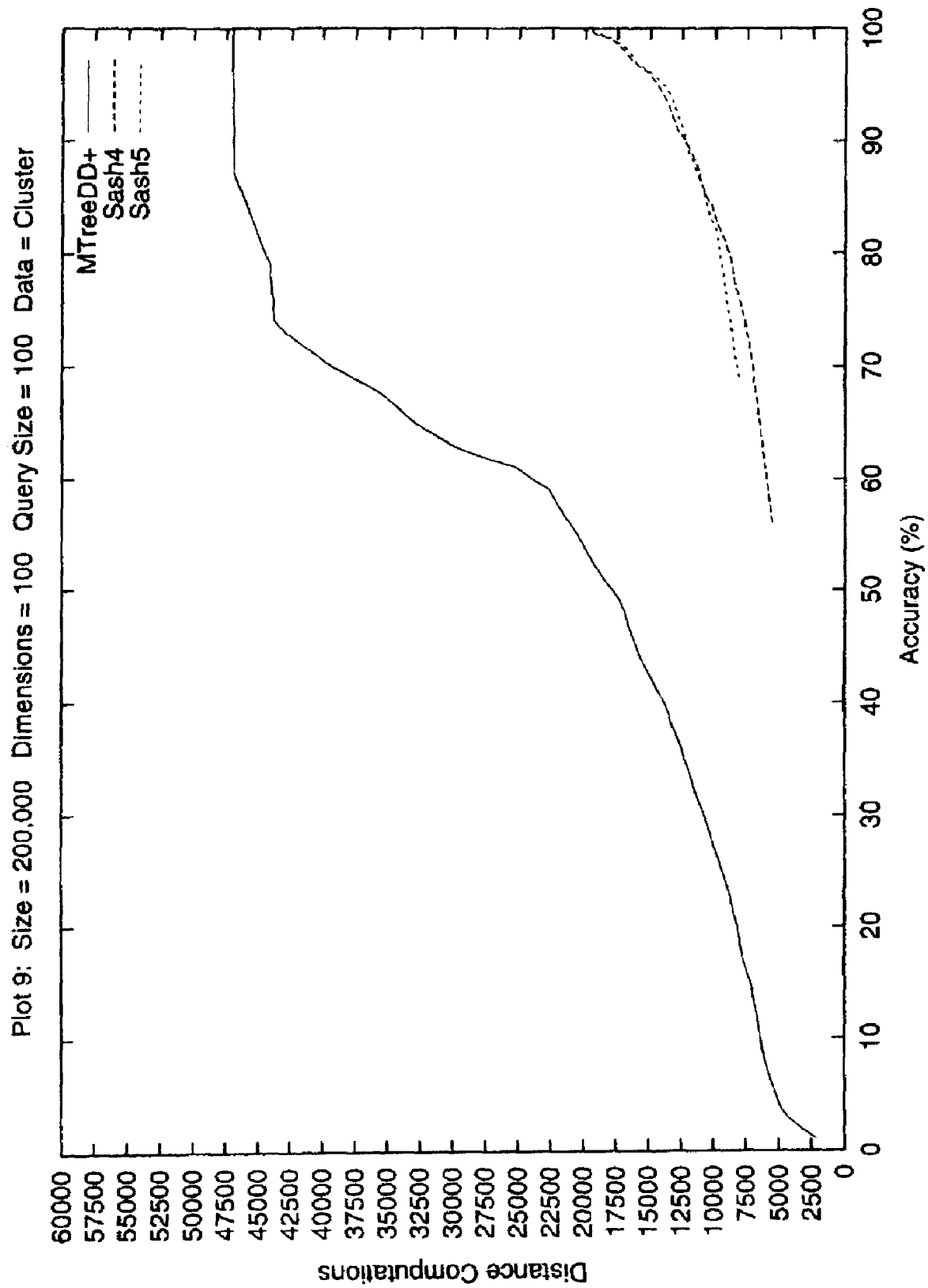
FIG. 22 shows results of the first experiment comparing the SASH methods to the MTreeDD+ method for query size 100 on a Cluster data set of size 200,000 and dimension 100.
Figure 23:
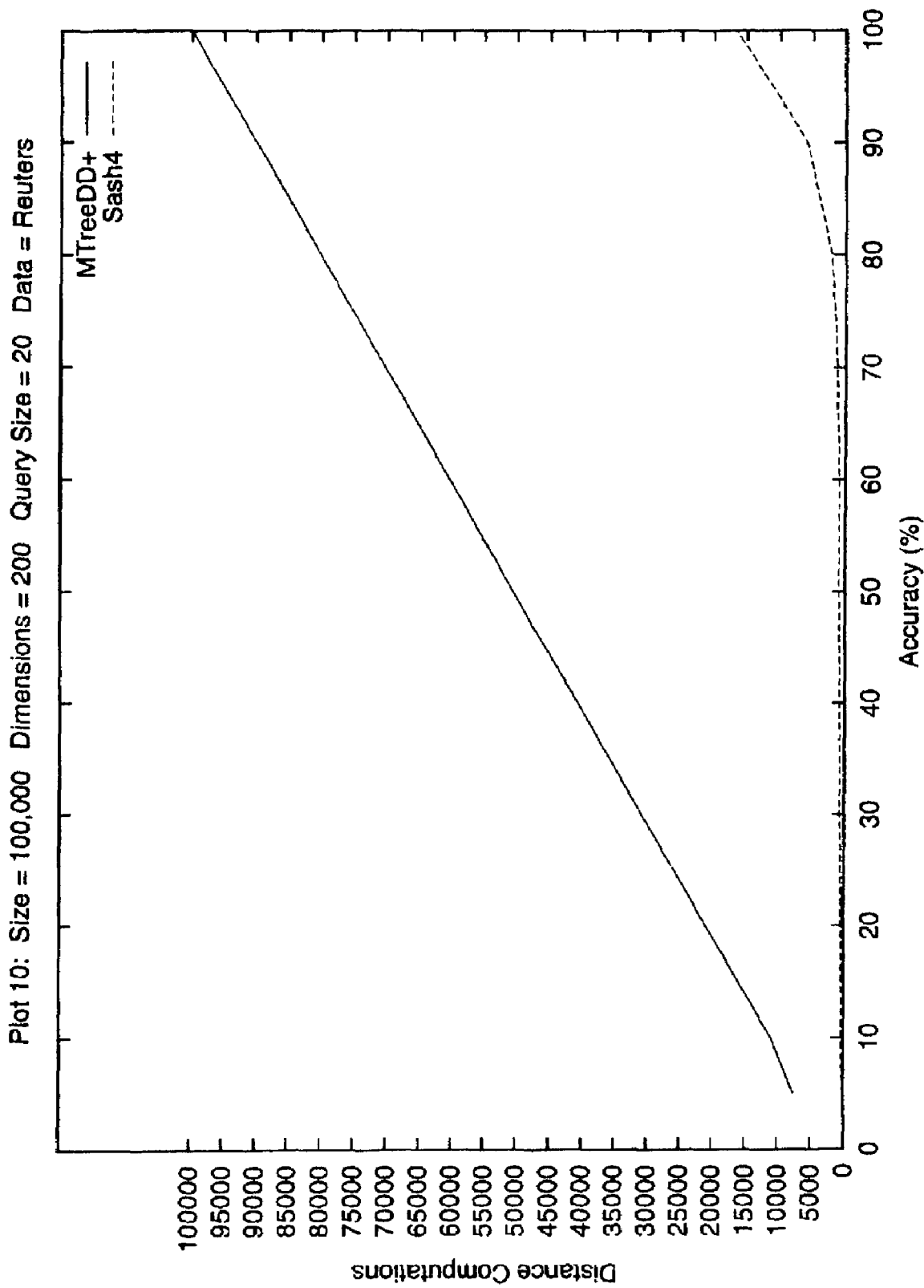
FIG. 23 shows results of the first experiment comparing the Sash4 method to the MTreeDD+ method for query size 20 on the Reuters data set of size 100,000 and dimensions 200.
Figure 24:
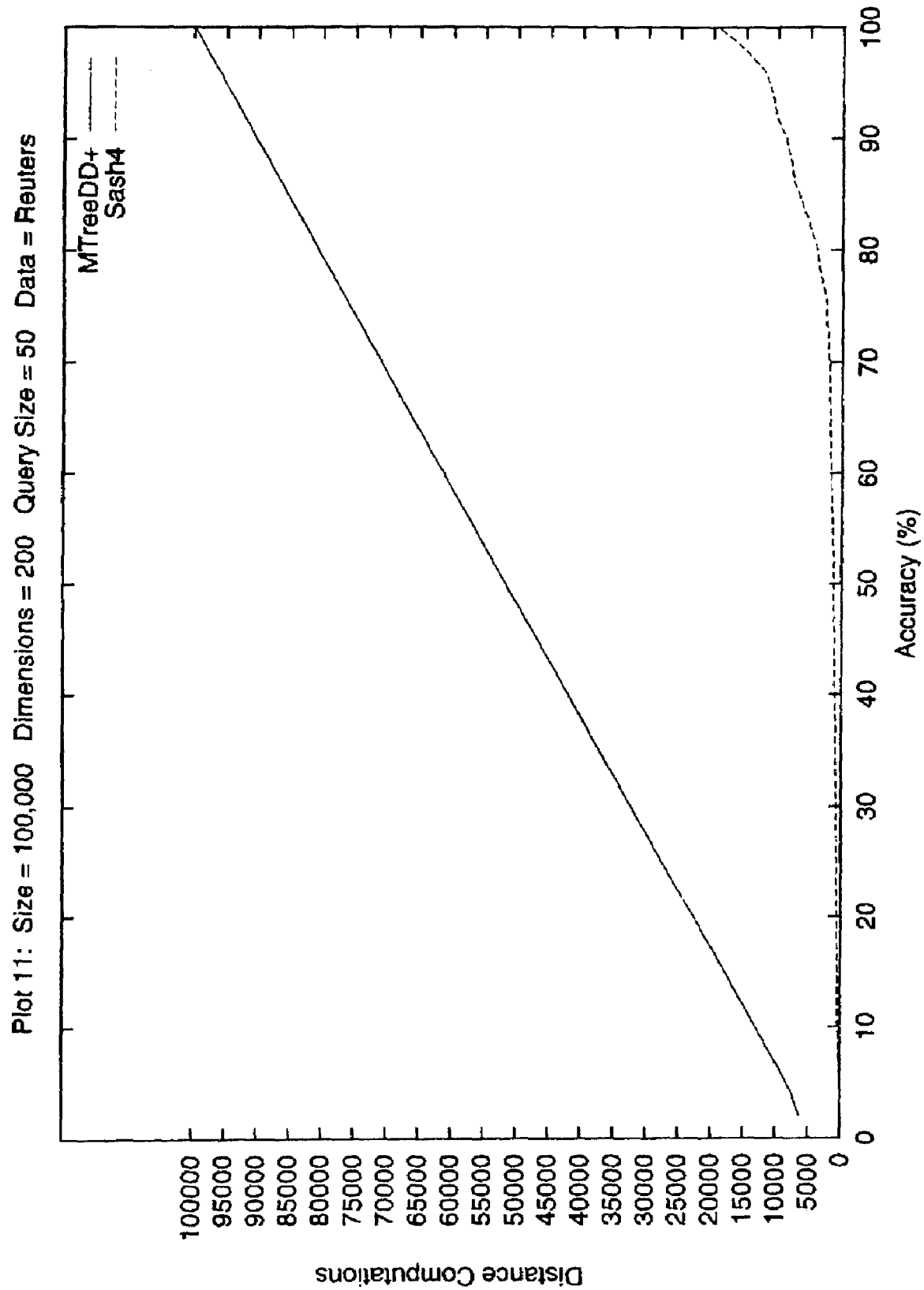
FIG. 24 shows results of the first experiment comparing the Sash4 method to the MTreeDD+ method for query size 50 on the Reuters data set of size 100,000 and dimensions 200.
Figure 25:
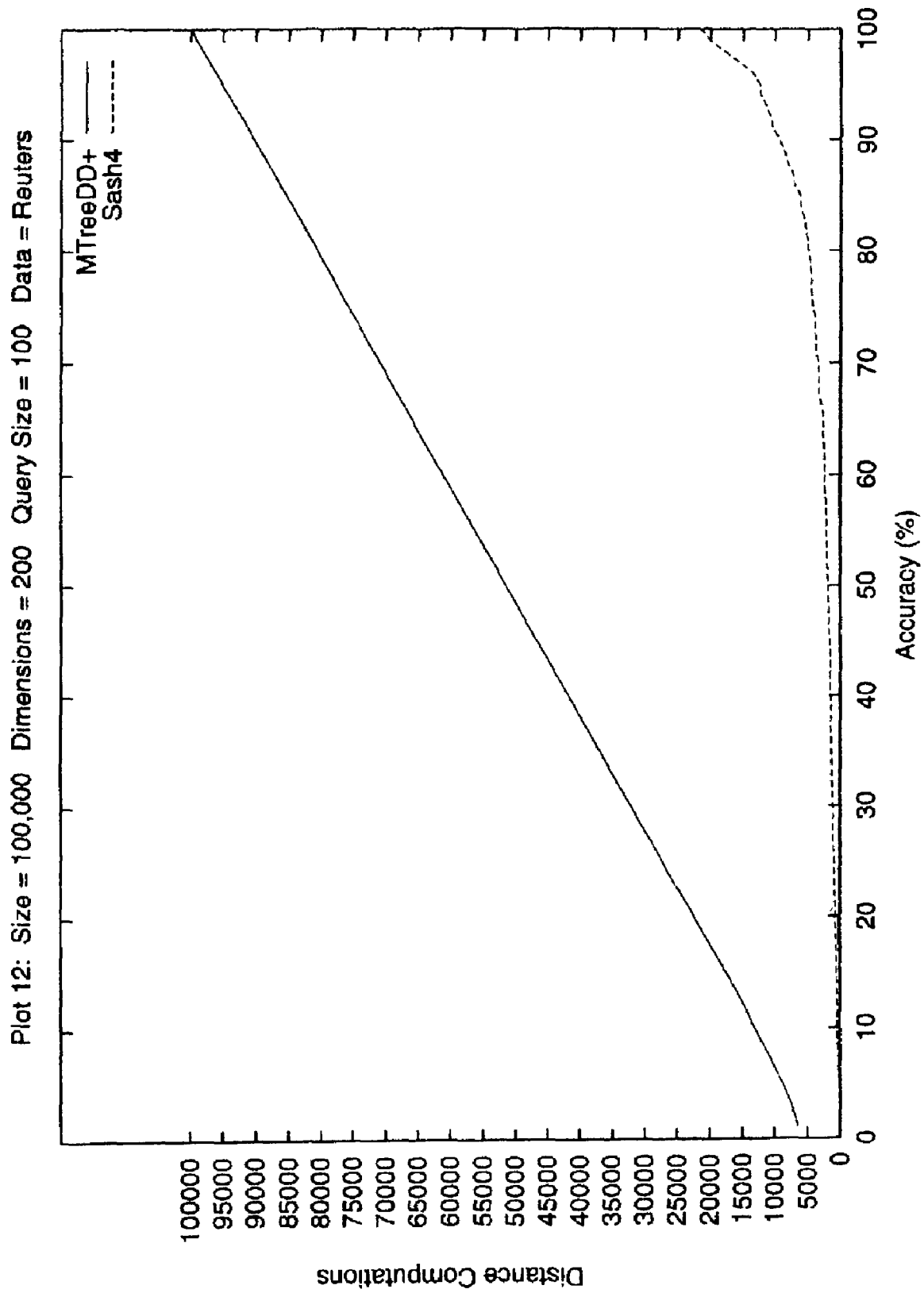
FIG. 25 shows results of the first experiment comparing the Sash4 method to the MTreeDD+ method for query size 100 on the Reuters data set of size 100,000 and dimensions 200.
Figure 26:
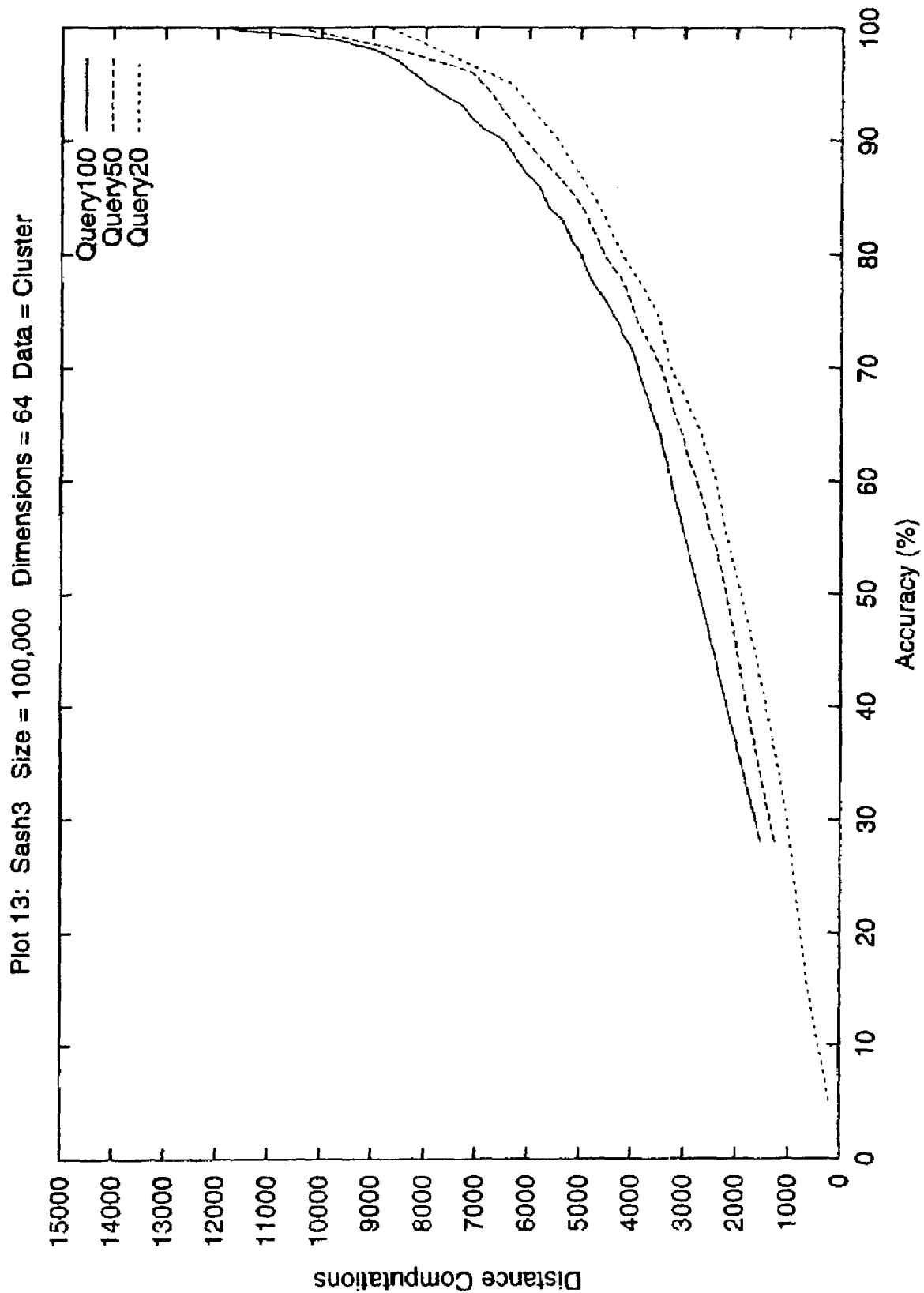
FIG. 26 shows the results of the Sash3, Sash4 and Sash5 methods on the Cluster data set, with 100,000 points in 64 dimensions—the same size and dimensions as the largest set considered by Ferhatosmanoglu et al. (2001) in their experimentation.
Figure 27:
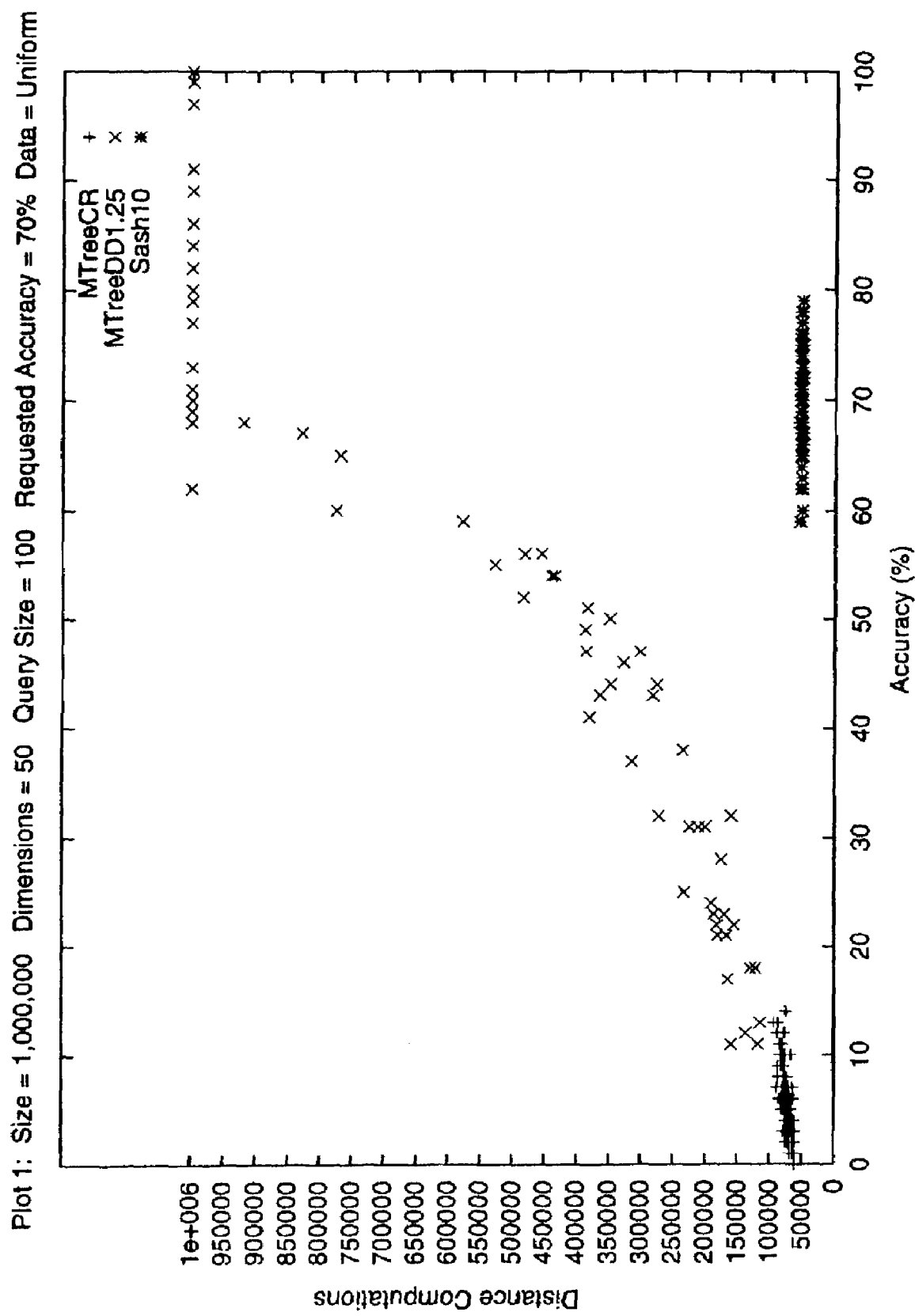
FIG. 27 shows the results of the second experiment on a Uniform data set, when the requested accuracy is 70%.
Figure 28:
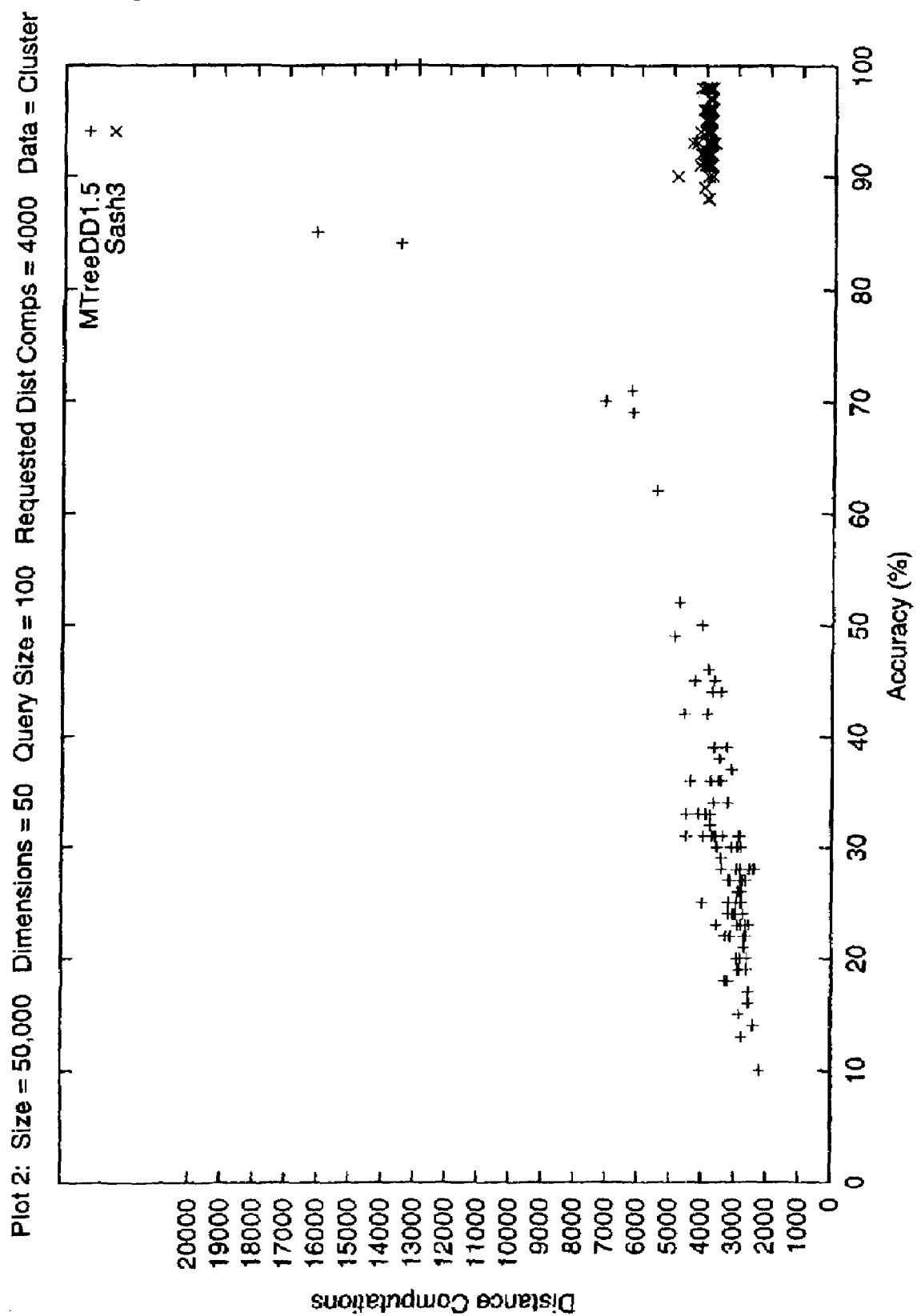
FIG. 28 shows the results of the second experiment on a Cluster data set, when the requested number of distance computations is 4000.
Figure 29:
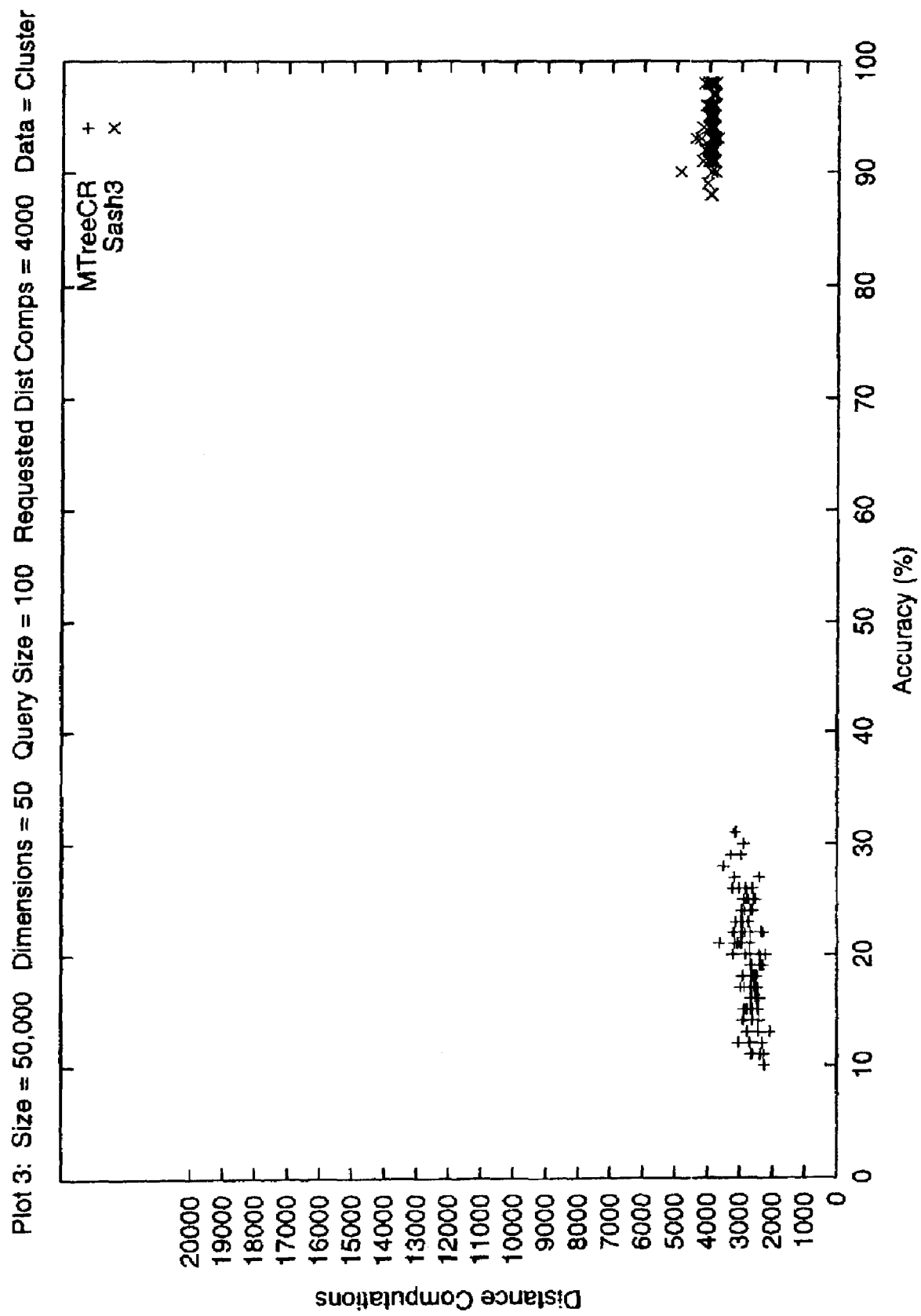
FIG. 29 shows further results of the second experiment on a Cluster data set, when the requested number of distance computations is 4000.
Figure 30:
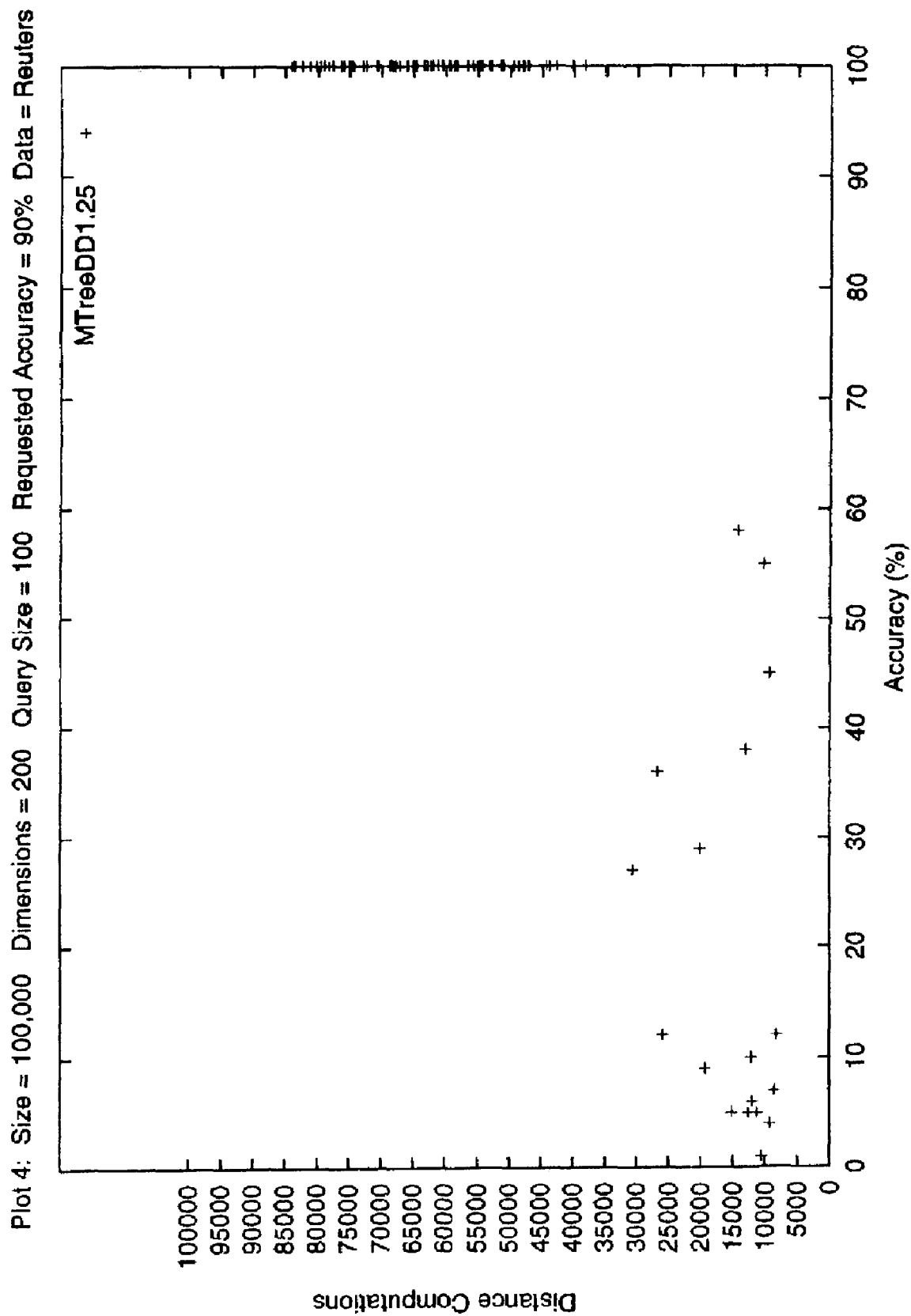
FIG. 30 shows the results of the second experiment on the Reuters data set using MTreeDD1.25, when the requested accuracy is 90%.
Figure 31:
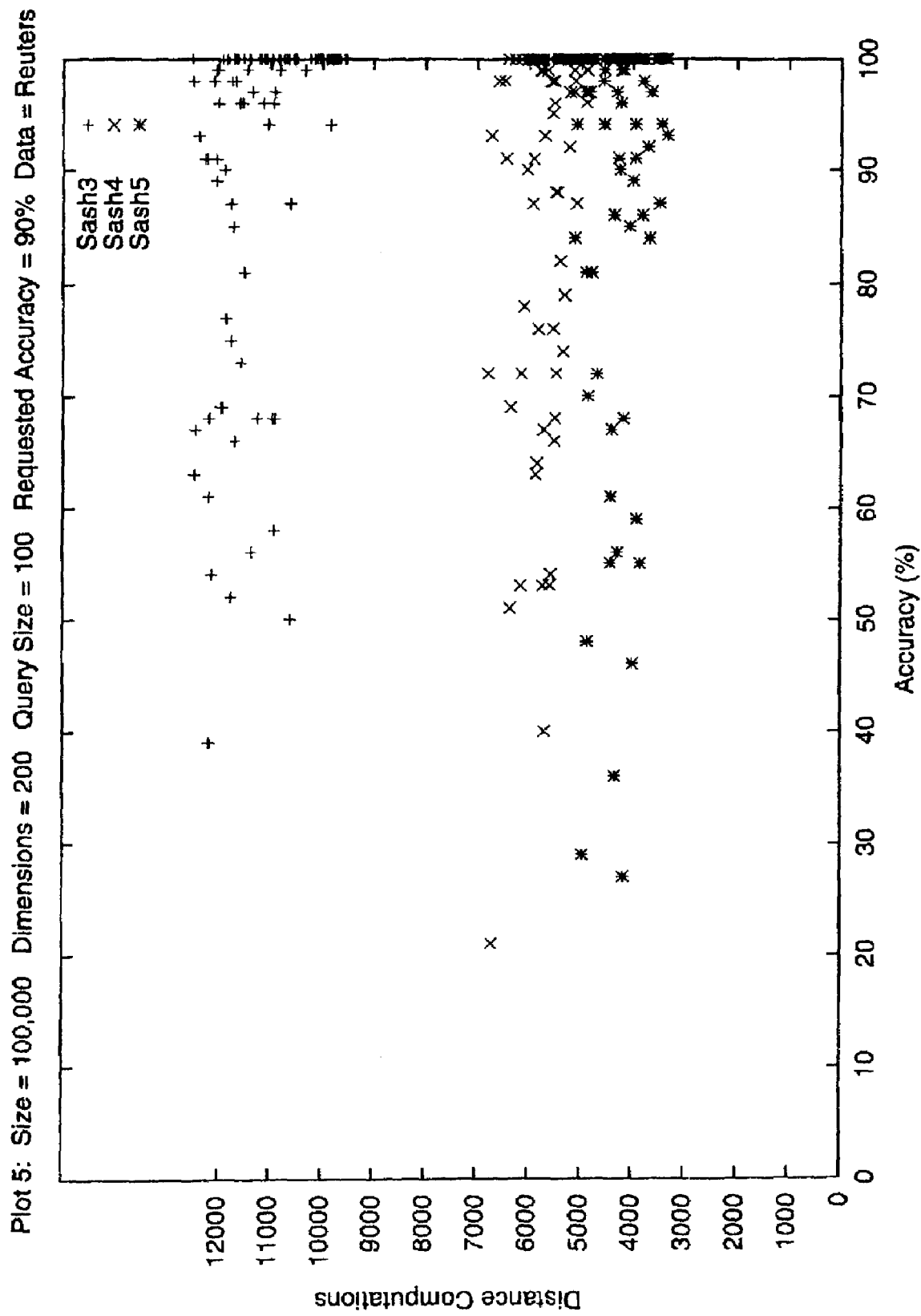
FIG. 31 shows the results of the second experiment on the Reuters data set using the SASH methods, when the requested accuracy is 90%.

The invention claimed is:

1. A method for information processing, said information being stored in a database of documents and including attributes, said information at least including a vector of numeral elements and information identifiers to form a matrix, said vector being a node in a hierarchy structure of said information, said method comprising the steps of:
transforming documents in the database into vectors using a vector space model to create a document-keyword matrix;
reducing a dimension of said matrix to a predetermined order to provide a dimension reduced matrix;
randomly assigning vectors of said dimension-reduced matrix to a set of nodes;
constructing a hierarchy structure of said nodes, where the document-keyword vectors are introduced with the hierarchy structure using distance between the document-keyword vectors said hierarchy structure being layered with hierarchy levels starting from a top node;
determining parent nodes and child nodes thereof between adjacent hierarchy levels, said parent nodes being included in an upper level and said child nodes being included in a lower level;
generating relations between said parent nodes and said child nodes by providing pointers to said parent nodes and said child nodes in relation to said distance;
registering pointers by starting from a node pair having closest distance until a predetermined number of pairs being generated,
providing a similarity-based query to rank said nodes with respect to said query;
executing a similarity-based information retrieval using the document-keyword matrix;
selecting said nodes to generate a cluster including said ranked nodes with respect to said query.

2. The method for information processing according to the claim 1, wherein said reduction step comprises the step of reducing the dimension of said matrix using latent semantic indexing or the covariance matrix method.

3. The method for information processing according to the claim 1, wherein said generating step further comprises the second step of generating another pair of pointers between a parent node and at least one child node having failed to generate said relation, said parent node being permitted to generate said pair of pointers and not having reached a predetermined number of pointers indicating child nodes.

4. The method for information processing according to the claim 1, wherein said information processing is selected from the group consisting of information retrieval, information detecting, information ranking, information tracking and any combination thereof.

5. An information processing system comprising a computer, an output/input interface and a database, said information being stored as documents in a database and including attributes, said information at least including a vector of numeral elements and information identifiers to form a matrix, said vector being a node in a hierarchy structure of said information, said information processing system comprising:
means for transforming the documents in the database into vectors using a vector space model to create a document-keyword matrix;
means for reducing a dimension of said matrix to a predetermined order to provide a dimension reduced matrix;
means for randomly assigning vectors of said dimension reduction matrix to a set of nodes;
means for constructing a hierarchy structure of said nodes, where the document-keyword vectors are introduced with the hierarchy structure using distance between the document-keyword vectors, said hierarchy structure being layered with hierarchy levels starting from a top node;
means for determining parent nodes and child nodes thereof between adjacent hierarchy levels, said parent nodes being included in an upper level and said child nodes being included in a lower level;

means for generating relations between said parent nodes and said child nodes by providing pointers to said parent nodes and said child nodes in relation to said distance; registering pointers by starting from a node pair having closest distance until a predetermined number of pairs being generated;

means for providing a similarity based query to rank said nodes with respect to said query;

means for selecting said nodes to generate a cluster including said ranked nodes with respect to said query.

6. The system according to the claim 5, wherein said means for reducing dimension comprises means for reducing dimension of said matrix using latent semantic indexing or the covariance matrix method.

7. The system according to the claim 5, wherein said means for generating relations further comprises means for executing a second generation of a pair of pointers between a parent node and at least one child node having failed to generate said relation, said parent node being permitted to generate said pair of pointers and not having reached a predetermined number of pointers indicating child nodes.

8. The system according to the claim 5, wherein said information processing is selected from the group consisting of information retrieval, information detecting, information ranking, information tracking and any combination thereof.

9. A computer readable medium storing a computer readable program for executing a method for information processing in a computer, said information being stored in a database as documents and including attributes, said information at least including a vector of numeral elements and information identifiers to form a matrix, said vector being a node in a hierarchy structure of said information, said method comprising the steps of:

transforming documents in the database into vectors using a vector space model to create a document-keyword matrix;

reducing a dimension of said matrix to a predetermined order to provide a dimension reduced matrix;

randomly assigning vectors of said dimension-reduced matrix to a set of nodes;

constructing a hierarchy structure of said nodes, where the document-keyword vectors are introduced with the hierarchy structure using distance between the document-keyword vectors said hierarchy structure being layered with hierarchy levels starting from a top node;

determining parent nodes and child nodes thereof between adjacent hierarchy levels, said parent nodes being included in an upper level and said child nodes being included in a lower level;

generating relations between said parent nodes and said child nodes by providing pointers to said parent nodes and said child nodes in relation to said distance; registering pointers by starting from a node pair having closest distance until a predetermined number of pairs being generated, providing a similarity-based query to rank said nodes with respect to said query;

executing a similarity-based information retrieval using the document-keyword matrix;

selecting said nodes to generate a cluster including said ranked nodes with respect to said query.

10. The computer readable medium according to the claim 9, wherein said reduction step comprises the step of reducing dimension of said matrix using latent semantic indexing or the covariance matrix method.

11. The computer readable medium according to the claim 9, wherein said generating step further comprises a second step of generation of a pair of pointers between a parent node and at least one child node having failed to generate said relation, said parent node being permitted to generate said pair of pointers and not having reached a predetermined number of pointers indicating child nodes.

12. The computer readable medium according to the claim 9, wherein said information processing is selected from the group consisting of information retrieval, information detecting, information ranking, information tracking and any combination thereof.

13. A computer executable program stored in a computer readable medium for information processing being possible to be implemented into a computer, said information being stored in a database as documents and including attributes, said information at least including a vector of numeral elements and information identifiers to form a matrix, said vector being a node in a hierarchy structure of said information, said computer program executing the steps of:

transforming documents in the database into vectors using a vector space model to create a document-keyword matrix;

reducing a dimension of said matrix to a predetermined order to provide a dimension reduced matrix;

randomly assigning vectors of said dimension-reduced matrix to a set of nodes; constructing a hierarchy structure of said nodes, where the document-keyword vectors are introduced with the hierarchy structure using distance between the document-keyword vectors said hierarchy structure being layered with hierarchy levels starting from a top node;

determining parent nodes and child nodes thereof between adjacent hierarchy levels, said parent nodes being included in an upper level and said child nodes being included in a lower level;

generating relations between said parent nodes and said child nodes by providing pointers to said parent nodes and said child nodes in relation to said distance; registering pointers by starting from a node pair having closest distance until a predetermined number of pairs being generated, providing a similarity-based query to rank said nodes with respect to said query;

executing a similarity-based information retrieval using the document-keyword matrix;

selecting said nodes to generate a cluster including said ranked nodes with respect to said query.

14. A computer executable program according to the claim 13, wherein said reduction step comprises the step of reducing dimension of said matrix using latent semantic indexing or the covariance matrix method.

15. A computer executable program according to the claim 13, wherein said generating step further comprises the second step of generating another pair of pointers between a parent node and at least one child node having failed to generate said relation, said parent node being permitted to generate said pair of pointers and not having reached a predetermined number of pointers indicating child nodes.

16. A computer executable program according to the claim 13, wherein said information processing is selected from the group consisting of information retrieval, information detecting, information ranking, information tracking and any combination thereof.

* * * * *